(12) United States Patent
Wild et al.

(10) Patent No.: US 9,362,635 B2
(45) Date of Patent: Jun. 7, 2016

(54) MINIMALLY INVASIVE MID-SPAN GROUNDING CLAMP AND METHOD OF USE THEREOF

(71) Applicant: John Mezzalingua Associates, LLC, East Syracuse, NY (US)

(72) Inventors: Werner K. Wild, Buttenwiesen (DE); Bernhard Strasser, Steinheim (DE); Christopher P. Natoli, Fulton, NY (US)

(73) Assignee: John Mezzalingua Associates, LLC, East Syracuse, NY (US)

( * ) Notice: Subject to any disclaimer, the term of this patent is extended or adjusted under 35 U.S.C. 154(b) by 178 days.

(21) Appl. No.: 13/948,532

(22) Filed: Jul. 23, 2013

(65) Prior Publication Data

US 2014/0024253 A1   Jan. 23, 2014

Related U.S. Application Data

(60) Provisional application No. 61/674,562, filed on Jul. 23, 2012, provisional application No. 61/791,888, filed on Mar. 15, 2013.

(51) Int. Cl.
*H01R 13/648* (2006.01)
*H01R 9/05* (2006.01)
*H01R 43/00* (2006.01)
(Continued)

(52) U.S. Cl.
CPC ............ *H01R 9/0524* (2013.01); *B23B 49/005* (2013.01); *B23B 51/00* (2013.01); *B23B 51/0406* (2013.01); *H01R 43/00* (2013.01); *H02G 1/00* (2013.01); *H02G 1/02* (2013.01); *H02G 7/22* (2013.01); *B23B 2226/61* (2013.01);
(Continued)

(58) Field of Classification Search
CPC ............ H01R 4/643; H01R 4/60; H01R 4/64; H01R 4/648
USPC ................................. 439/100, 95, 97; 174/78
See application file for complete search history.

(56) References Cited

U.S. PATENT DOCUMENTS 3,830,957 A   8/1974  Oberdiear
3,887,895 A * 6/1975  Pierzchala ............. H01R 4/646
                                                 174/78

(Continued)

OTHER PUBLICATIONS

PCT/US2013/051670: International Search Report and Written Opinion; Date of Mailing: Mar. 6, 2014; 6 Pages.

*Primary Examiner* — Hien Vu
(74) *Attorney, Agent, or Firm* — Barclay Damon, LLP

(57) ABSTRACT

A grounding clamp is provided that includes a grounding wire having two ends that are each configured to extend out an opening in a coaxial cable. The grounding clamp includes a housing configured to receive both ends of the extending wire in an inner chamber through a first opening, the housing including a second opening configured to receive a lug, wherein the lug is configured to secure both ends of the grounding wire within the inner chamber. A method of installing a grounding clamp includes attaching a fishline to a grounding wire and inserting the fishline through an opening of a corrugated coaxial cable in a valley located between an outer conductor and an outer jacket of the coaxial cable, wherein the fishline is rigid enough that it does not buckle or deform significantly under the pressure of the outer conductor and the outer jacket, wherein the fishline is flexible enough that it bends around the corrugated coaxial cable. A drill bit for creating an opening in a coaxial cable is also contemplated, along with a tool for fishing the grounding wire through the coaxial cable.

11 Claims, 21 Drawing Sheets

(51) Int. Cl.
  *B23B 51/00* (2006.01)
  *H02G 1/00* (2006.01)
  *H02G 1/02* (2006.01)
  *H02G 7/22* (2006.01)
  *B23B 49/00* (2006.01)
  *B23B 51/04* (2006.01)

(52) U.S. Cl.
  CPC .......... *Y10T 29/49123* (2015.01); *Y10T 408/89* (2015.01)

(56) References Cited

U.S. PATENT DOCUMENTS

| | | | |
|---|---|---|---|
| 4,365,859 A | 12/1982 | Hutter et al. | |
| 4,547,623 A | 10/1985 | Van Brunt et al. | |
| 4,808,072 A | 2/1989 | Moore et al. | |
| 5,122,068 A | 6/1992 | Koss | |
| 5,713,748 A | 2/1998 | Mulvihill | |
| 5,829,992 A | 11/1998 | Merker et al. | |
| 5,850,056 A * | 12/1998 | Harwath | H01R 4/646 174/40 CC |
| 5,945,634 A | 8/1999 | Shimirak et al. | |
| 6,254,404 B1 | 7/2001 | Sedlecky | |
| 6,297,447 B1 | 10/2001 | Burnett et al. | |
| 6,312,281 B1 | 11/2001 | Rodriguez | |
| 6,322,378 B1 * | 11/2001 | Auclair | H01R 13/5812 439/98 |
| 6,398,596 B1 * | 6/2002 | Malin | H01R 4/42 174/78 |
| 6,639,146 B1 | 10/2003 | Chiu | |
| 7,115,006 B2 | 10/2006 | Onuma | |
| 8,152,537 B1 | 4/2012 | Montena | |
| 8,152,559 B1 | 4/2012 | Montena | |
| 2001/0021598 A1 | 9/2001 | Miettinen et al. | |
| 2002/0153157 A1 | 10/2002 | Harger | |

* cited by examiner

_US 9,362,635 B2_

MINIMALLY INVASIVE MID-SPAN GROUNDING CLAMP AND METHOD OF USE THEREOF

CROSS REFERENCE TO RELATED APPLICATIONS

This application claims the benefit of U.S. Provisional Application No. 61/674,562, filed Jul. 23, 2012, entitled MINIMALLY INVASIVE MID-SPAN GROUNDING CLAMP AND METHOD OF USE THEREOF. This application also claims the benefit of U.S. Provisional Application No. 61/791,888, filed Mar. 15, 2013, entitled MINIMALLY INVASIVE MID-SPAN GROUNDING CLAMP AND METHOD OF USE THEREOF.

FIELD OF TECHNOLOGY

The following relates to embodiments of a grounding clamp and more specifically to embodiments of a mid-span grounding clamp for a coaxial cable.

BACKGROUND

Due to the Radio Frequency (RF) system design preference of a clear line-of-sight, cellular towers tend to be located at high elevations relative to their surroundings. This makes them vulnerable to lightning strikes, and to prevent damage to the tower and the radio gear on it, feeder cables are electrically bonded to the tower at regular intervals. Grounding at midpoint locations on cables divert lightning strike currents that may travel along the cable to the tower or other cabling specifically installed to handle high current and/or high voltage. However, in the field, grounding clamps located at mid-span locations on coaxial cables sometimes invite corrosion and environmental elements to enter the inner components of the coaxial cable. Most grounding kits require a circumferential band of cable jacket material to be removed to expose an outer conductor of a coaxial cable. The exposed outer conductor must be covered, and the edges of the remaining cable jacket must be sealed entirely circumferentially around the jacket in at least two places. This sealing can be accomplished with a clamshell type grounding clamp, but the edges of the jacket that need to sealed are usually discontinuous edges resulting from the removal process, and are prone to leaking. The difficulty in providing an annular seal along discontinuous edges leads to moisture migration under the cable jacket to other equipment along the feeder cable.

Thus, a need exists for an apparatus and method for a minimally invasive grounding clamp that can engage the outer conductor and provide grounding without removing an annular portion of the cable jacket.

SUMMARY

A first aspect relates generally to a grounding clamp that includes a grounding wire having two ends that are each configured to extend out an opening in a coaxial cable; and a housing configured to receive both ends of the extending wire in an inner chamber through a first opening, the housing including a second opening configured to receive a lug, wherein the lug is configured to secure both ends of the grounding wire within the inner chamber.

A second aspect relates generally to a method of installing a grounding clamp comprising: attaching a fishline to a grounding wire; and inserting the fishline through an opening of a corrugated coaxial cable in a valley located between an outer conductor and an outer jacket of the coaxial cable, wherein the fishline is rigid enough that it does not buckle or deform significantly under the pressure of the outer conductor and the outer jacket, wherein the fishline is flexible enough that it bends around the corrugated coaxial cable.

A third aspect relates generally to a drill bit comprising: a circumferential base; a plurality of teeth disposed circumferentially about the circumferential base, the plurality of teeth being made of a material that is softer than an outer conductor of a standard corrugated coaxial cable, the circumferential base having a greater diameter than the plurality of teeth, wherein the amount that the plurality of teeth extend from the circumferential base corresponds to the thickness of the outer jacket of the standard corrugated coaxial cable.

A fourth aspect relates generally to a tool comprising: a handle having an outer member and an inner member, wherein the inner member is configured to rotate about the outer member, and wherein the inner member may include an opening configured to receive a fishline such that rotation of the inner member about the outer member wraps the received fishline about the inner member; and a first finger spaced apart from a second finger, the first and second fingers extending from the handle, the first and second fingers being curved such that the first and second fingers are curved with at least one of the same and substantially the same radius of curvature as an outer jacket of a coaxial cable.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein:

FIG. 16b depicts a side cutaway view of the tool of FIG. 16a;

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
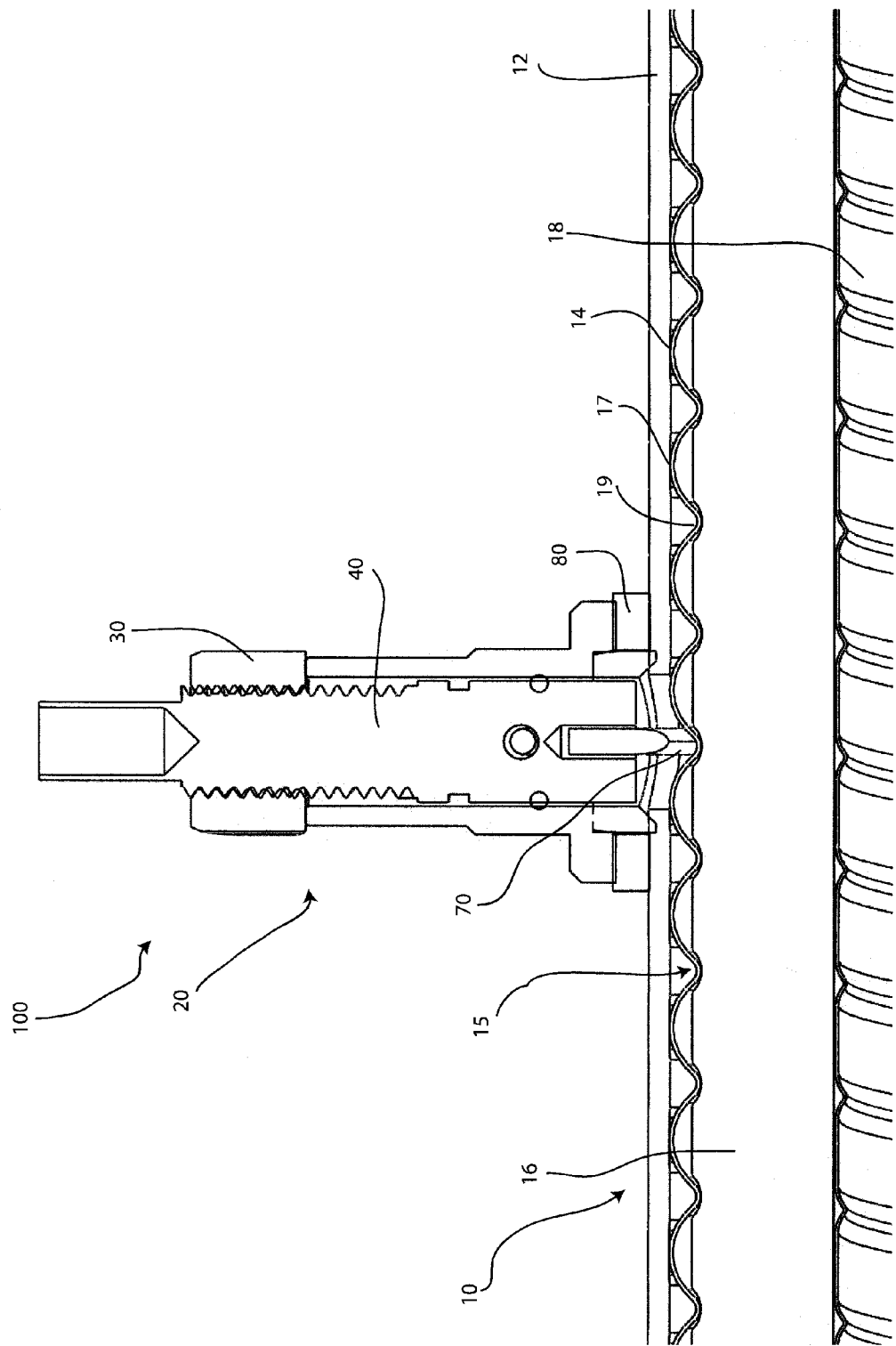
FIG. 1 depicts a cross-sectional, side view of an embodiment of a grounding clamp attached to an embodiment of a coaxial cable.

Referring to the drawings, FIG. 1 depicts an embodiment of a grounding clamp 100. Embodiments of grounding clamp 100 may be configured to attach to a coaxial cable 10 at a mid-span location. A mid-span location should not be limited to a midpoint of a coaxial cable 10; a mid-span location may be any location along the coaxial cable 10 that is at least a distance away from either end of the cable 10. There may be more than one grounding clamp 100 located at various points along the same cable 10 to facilitate adequate grounding of the cable 10 at a location other than the ends.

Figure 2:
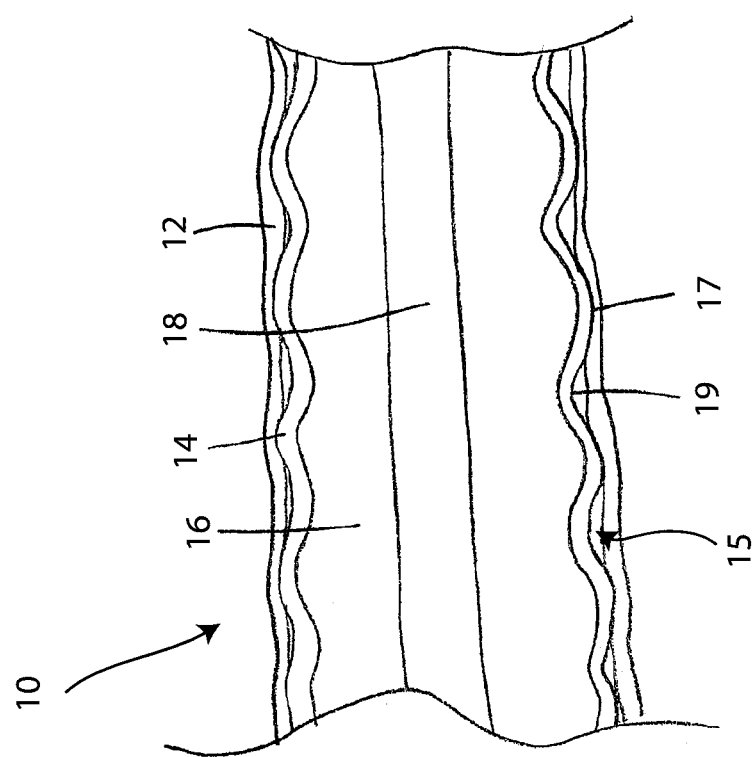
FIG. 2 depicts a cross-sectional view of a coaxial cable.

With reference to FIG. 2, embodiments of a coaxial cable 10, such as a feeder cable attached to a cellular tower, may include a center conductor 18, such as a strand of conductive metallic material, surrounded by an interior dielectric 16; the interior dielectric 16 may be surrounded by an outer conductor 14; the outer conductor 14 may be surrounded by a protective outer jacket 12, wherein the protective outer jacket 12 has dielectric properties and serves as an insulator. The center conductor 18 may be hollow or tubular, such as a standard tubular center conductor associated with a standard 50 Ohm cable. Embodiments of the center conductor 18 may be smooth walled, or may have multiple corrugations. The outer conductor 14 may extend a grounding path providing an electromagnetic shield about the center conductor 18 of the coaxial cable 10. The outer conductor 14 may be a rigid or semi-rigid outer conductor of the coaxial cable 10 formed of conductive metallic material, and may be corrugated, or otherwise grooved, or smooth walled. For instance, the outer conductor 14 may be annularly ribbed, spiral corrugated, or helical corrugated. The corrugations of the outer conductor 14 may define annular gaps 15 between the inner surface of the jacket 12 and the outer surface of the outer conductor 14. In other words, the peaks 17 of a corrugated outer conductor 14 may physically contact the cable jacket 12 while the valleys 19 of the corrugated outer conductor 14 may not contact the jacket 12, leaving an annular gap 15 between the conductor 14 and the jacket 12. Embodiments of the annular gap 15 may be an annular channel, an opening, a space, a groove, and the like. The protective outer jacket 12 can physically protect the various components of the coaxial cable 10 from damage that may result from exposure to dirt or moisture, and from corrosion. Moreover, the outer conductor 14 can be comprised of conductive materials suitable for carrying electromagnetic signals and/or providing an electrical ground connection or electrical path connection. The dielectric 16 may be comprised of materials suitable for electrical insulation. The protective outer jacket 12 may also be comprised of materials suitable for electrical insulation. It should further be recognized that the radial thickness of the coaxial cable 10, protective outer jacket 12, outer conductor 14, interior dielectric 16, and/or center conductor 18 may vary based upon generally recognized parameters.

Embodiments of cable 10 that the grounding clamp 100 can be attached to may extend to embodiments other than coaxial RF cable; embodiments of cable 10 may be a conduit or other cable that can be grounded, or where grounding would be needed. For instance, it is often necessary to ground conduit carrying multiple inner wires such as Ethernet cables, fiber optic cables, and power runs. Accordingly, embodiments of grounding clamp 100, and associated methods of installing grounding clamp 100, may be used with any conduit or cable that includes a corrugated layer covered by a protective sheathing.

Figure 3:
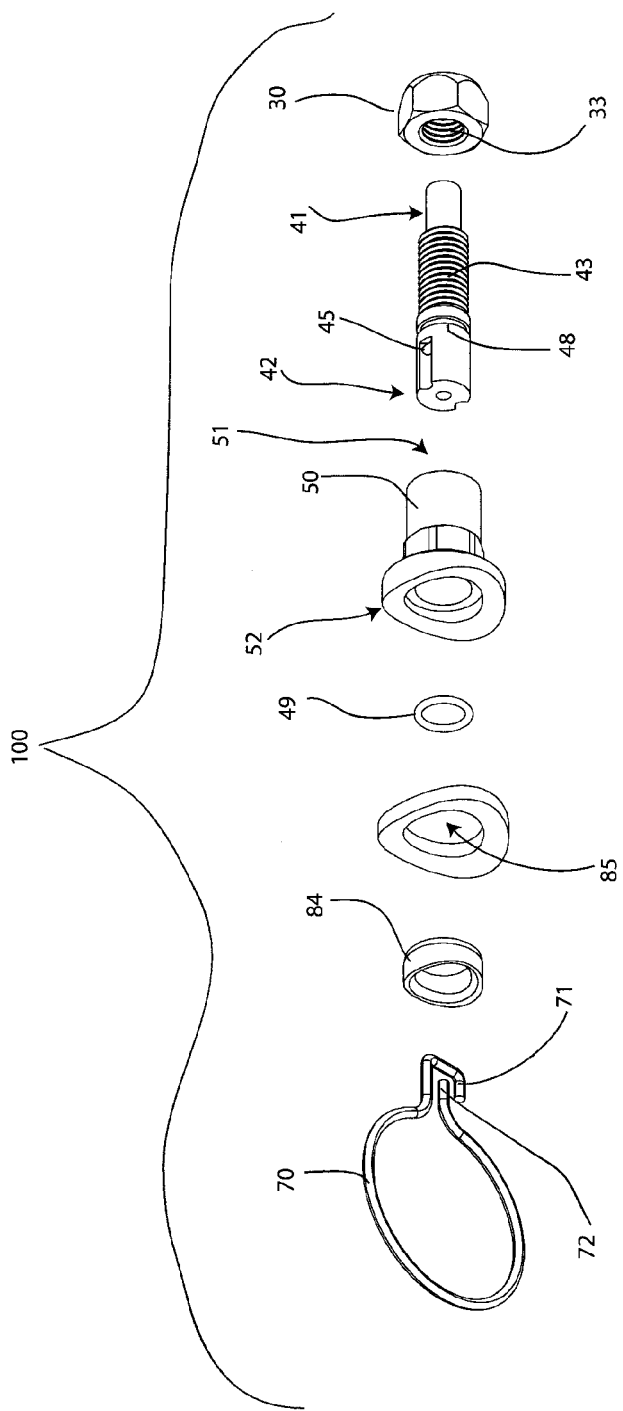
FIG. 3 depicts an exploded view of an embodiment of the grounding clamp.
Figure 4:
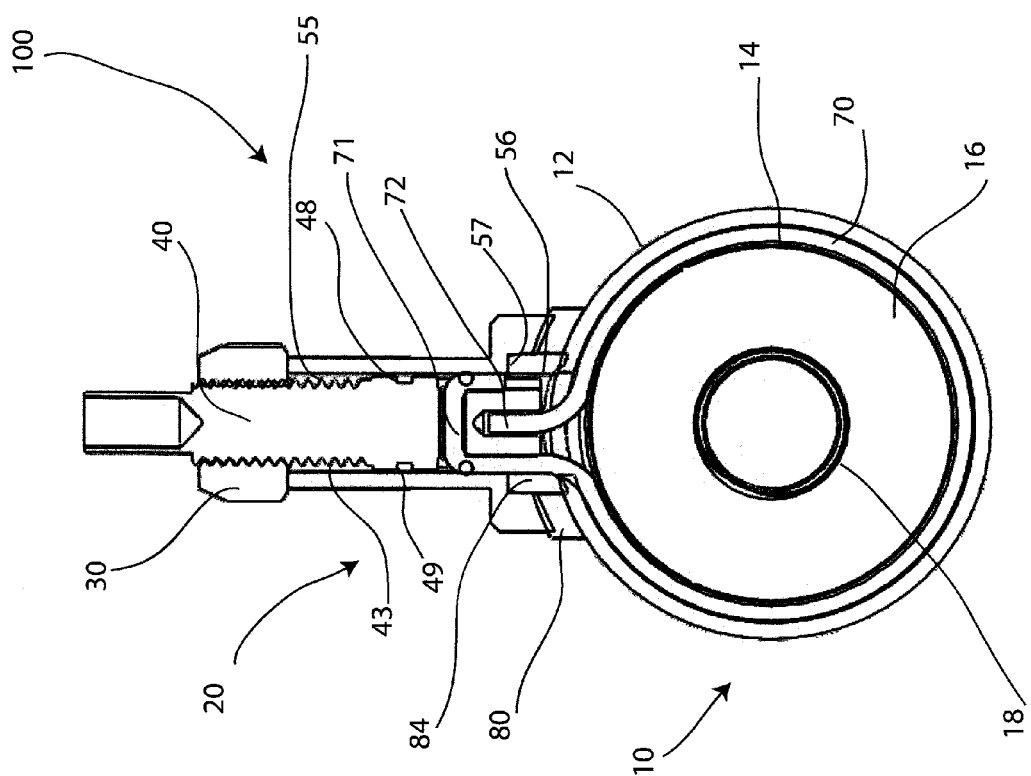
FIG. 4 depicts a cross-sectional, front view of an embodiment of the grounding clamp attached to a coaxial cable.
Figure 5:
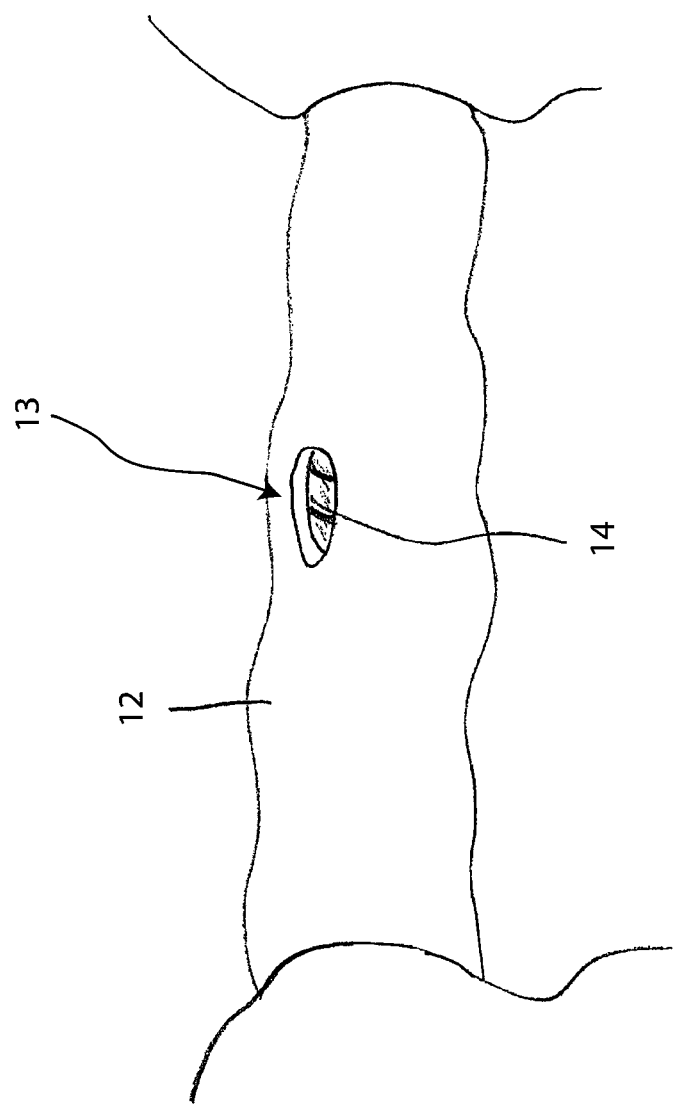
FIG. 5 depicts an embodiment of a cable having a non-circumferential opening.

Referring now to FIGS. 3 and 4, embodiments of the grounding clamp 100 may be configured to attach to a coaxial cable 10 by tensioning, or drawing tight, a grounding wire 70 around the outer conductor 14 through a non-circumferential opening 13 in the cable jacket 12. For instance, an installer may create an opening 13 in the cable jacket 12 that does not extend circumferentially around the cable jacket 12, as shown in FIG. 5. Embodiments of the opening 13 may be a hole, an access point, a gap, a break, an aperture, and the like, having a size or diameter that at least allows the grounding wire 70 to pass through and does not leave annular edges to seal around the jacket 12. The non-circumferential opening 13 in the jacket can avoid the need to seal annular edges that extend circumferentially around the jacket 12 in a 360° fashion. Once the opening 13 has been created, an installer may begin attaching the grounding clamp 100 to the cable 10.

Embodiments of the grounding clamp 100 may include a cable sealing element 80, a grounding wire 70, and a tensioning device 20, wherein the grounding wire 70 is configured to encircle the outer conductor 14 of the cable 10 and be drawn tight by the tensioning device 20.

Embodiments of the grounding clamp 100 may include a cable sealing element 80. The cable sealing element 80 may be configured to seal against the surface of the cable jacket 12 and help prevent ingress of moisture and other environmental elements into the opening 13 of the cable jacket 12. Embodiments of the cable sealing element 80 may be disposed directly onto the cable jacket 12 surface proximate the opening 13, wherein the cable sealing element 80 includes an opening or hole 85 sized and dimensioned to at least allow the grounding wire 70 to pass through and enter the cable 10. Embodiments of the cable sealing element 80 may be arcuate or arcuately shaped to conform or correspond to the curvature of cable 10. Furthermore, the tensioning device 20 may be placed onto the cable sealing element 80 to provide additional sealing and potential deformation of the cable sealing element 80. Embodiments of the cable sealing element 80 may be made of elastomeric materials, and may be resilient or deformable to sealing engage the cable jacket 12 proximate or otherwise near the opening 13 of the jacket 12. In one embodiment, the cable sealing element 80 is a rubber grommet. Moreover, the cable sealing element 80 can be formed of an elastic polymer, such as rubber, or any resilient material responsive to radial compression and/or deformation. Manufacture of the cable sealing element 80 may include casting, extruding, cutting, turning, drilling, knurling, injection molding, spraying, blow molding, component overmolding, or other fabrication methods that may provide efficient production of the component.

Embodiments of the grounding clamp 100 may include a grounding wire 70. Embodiments of the grounding wire 70 may be a wire, cable, strand, line, rod, lead, and the like, that may enter the cable 10 and engage the outer conductor 14. Embodiments of the grounding wire 70 may be flexible to allow the wire 70 to conform to an annular surface of the outer conductor 14 within one of the annular gaps 15, but may retain some amount of rigidity or stiffness to resist deformation in response to the applied forces acting on the grounding wire 70. Embodiments of the grounding wire 70 may be cylindrical, 2000 strand wire having a diameter of approximately 5 mm. Moreover, embodiments of the grounding wire can be conductive, and made of one or more conductive materials. For example, the grounding wire 70 may be a tin plated copper wire. Embodiments of the grounding wire 70 may be configured to wrap around, encircle, surround, etc. the outer conductor 14 of the cable 10 to provide grounding to the cable 10. For example, the grounding wire 70 may enter the opening 13 in the jacket 12 and take advantage of one of the annular gaps 15 between the exterior surface of the outer conductor 14 and the inter surface of jacket 12 to reside within the cable 10, and upon further entry of the grounding wire 70 into the opening 13, the grounding wire 70 may continue to wrap around, encircle, surround, etc. the outer conductor 14 and ultimately pass back through the opening 13 in the jacket 12 to exit the cable 10. When the grounding wire 70 is wrapped around the outer conductor 14 when initially forced through the opening 13 and around the outer conductor 14, the grounding wire 70 may physically and electrically contact the outer conductor 14 at one or more locations. In other words, embodiments of the grounding wire 70 may reside within a valley 19 of the outer conductor 14 between at least two peaks 17 of the outer conductor 14, making physical and electrical contact with the outer conductor at at least one location. It is possible that when the grounding wire 70 is advanced further into the opening 13 of the cable jacket 12, the grounding wire 70 may be guided by the peaks 17, the valley 17, (e.g. the exterior surface shape of the outer conductor 14) and the inner surface of the cable jacket 12 between at least two peaks 17. In at least one alternative embodiment, the forward end of the grounding wire 70 may not completely encircle the outer conductor 14 and only partially wrap around or surround the outer conductor 14. The grounding wire 70 may be wrapped around the outer conductor 14 more than once before exiting the opening 13 and being retained by the tensioning device 20. If the grounding wire 70 is wrapped around the outer conductor 14 more than once, the grounding wire 70 may reside in more than one corrugation or annular gap 15 of the outer conductor 14, in an annular corrugated or helically corrugated outer conductor 14. In yet another alternative embodiment, the cable 10 may not include a jacket 12, such as an indoor application, embodiments of the grounding wire 70 can be wrapped around the outer conductor 14 to provide the necessary grounding for the cable.

Furthermore, the grounding wire may have a first end 71 and a second end 72. The first end 71 may be a free end, and may also be referred to as a forward end. The first end 71 may be configured to enter the non-circumferential opening 13 in the cable jacket 12, and be passed around a corrugation or the outer surface of the outer conductor 14. The first end 71, or forward end, may then pass back through the opening 13 to exit the cable 10 and retainably engage the tensioning device 20. Embodiments of the second end 72 of the grounding wire 70 may be attached or removably attached to the tensioning device 20. For example, the second end 72 of the grounding wire may be fixedly attached to the tensioning device 20, removably attached, adhered, fastened, and the like to the tensioning device 20. In one embodiment, the second end 72 of the grounding wire is soldered to the tensioning device 20.

Referring still to FIGS. 3 and 4, embodiments of the grounding clamp 100 may include a tensioning device 20. Embodiments of the tensioning device 20 may be configured to increase a tension of the grounding wire 70. For instance, embodiments of the tensioning device 20 may draw the grounding wire 70 tight around the outer conductor 14 by increasing the tension of the grounding wire 70. Increasing the tension of the grounding wire 70 may help establish and maintain continuous physical and electrical contact between the outer conductor 14 and the grounding wire 70, and may also help to eliminate intermittent physical and electrical contact between the outer conductor 14 and the grounding wire 70; continuous physical contact between the grounding wire 70 and the outer conductor 14 may improve effectiveness of the grounding clamp 100. Embodiments of the tensioning device 20 may retain or secure one or both ends 71, 72 of the grounding wire 70, and displace the ends 71, 72 in a direction away from the cable 10 to provide tension to the grounding wire 70. For instance, the tensioning device 20 may act to reduce gaps or intermittent contact between the grounding wire 70 and the outer conductor 14 by tightening the grounding wire 70.

Additionally, the tensioning device 20 may be configured to fasten the cable sealing element 80 in a position on the cable 10 to effectuate a seal of the opening 13 of the cable jacket 12. As the tensioning device 20 provides tension to the grounding wire 70, the cable seal element 80 may deform under compression loads exerted by the tensioning device 20 onto the body of the cable sealing element 80. The compression of the cable sealing element 80 may hinder or prevent displacement of the cable sealing element 80 over time, especially in outdoor conditions. Thus, the tensioning device 20, or a portion or component thereof, may engage the cable sealing element 80 when operably assembled, and may include an engagement surface or bottom surface and/or shape that corresponds to the acruate or arcuately shaped body of the cable sealing element 80 and/or the cable 10. Furthermore, embodiments of the tensioning device 20 may incorporate one or more sealing elements, such as an O-ring or rubber grommet, to effectuate an environmental seal at one or more locations where moisture could migrate and travel to the opening 13 of the cable jacket 12 and come into contact with the outer conductor 14. Various tensioning devices 20 and methods for tensioning the grounding wire 70 and securing the cable sealing element 80 onto the cable 10 may be used. For instance, embodiments of a tensioning device 20 may be bands, zip-ties, hose clamps, or a structural clamshell.

FIGS. 3 and 4 depicts an exemplary embodiment of a tensioning device 20 that may include a housing body 50, a threaded shaft 40, and an actuator 30.

Embodiments of the housing body 50 may include a first end 51 and a second end 52, and may be a one-piece component. The housing body 50 may include a generally axial opening therethrough, such as a bore or inner opening. Embodiments of the housing body 50 may have a first inner diameter portion 55 and a second inner diameter portion 56. Defining a difference in diameter between the first inner diameter portion 55 and the second inner diameter portion 56 can be an internal annular lip 57. The first inner diameter portion 55 may be sized and dimensioned to accommodate a threaded shaft 40, or a portion thereof, including a portion of the threaded shaft 40 retainably engaged with the grounding wire 70 disposed within the first inner diameter portion 55; the second inner diameter portion 56 may be sized and dimensioned to accommodate an end portion of the threaded shaft 40 retainably engaged with the grounding wire 70, as well as potentially another cable seal element 84. The second end 52 of the housing body 50 may be configured to engage the cable seal element 80, or rest upon the cable seal element 80 and compress and/or deform the cable seal element 80 when the grounding wire 70 is drawn tight. For instance, as the grounding wire 70 is drawn tight around the outer conductor 14, the housing body 50, in particular the bottom surface at the second end 52 may compress the cable seal element 80 to securely retain the cable seal element 80 as well as deform the cable seal element 80 into a sealing engagement or further sealing engagement with the cable 10. Thus, the housing body 50, or a portion or component thereof, may engage the cable sealing element 80 when operably assembled, and may include an engagement surface or bottom surface and/or shape that corresponds to the acruate or arcuately shaped body of the cable sealing element 80 and/or the cable 10. Moreover, embodiments of the housing body 50 may be made of conductive or non-conductive materials, and could be made of metals, composites, plastic, or any suitable material to form a rigid body.

Embodiments of a threaded shaft 40 may be disposed within the housing body 50, and configured to pull the grounding wire 70 in a direction away from the cable 10 when the threaded shaft 40 is drawn upwards with respect to the housing body 50. Embodiments of the threaded shaft 40 may include a first end 41, a second end 42, and a threaded exterior portion 43. An end portion, or second end 72, of the grounding wire 70 may be attached to the second end 42 of the threaded shaft 40. In one embodiment, the second end 72 of the grounding wire is fixedly attached to the second end 42 of the threaded shaft by solder, weld, adhesive, fastener, and the like. The second end 72 of the grounding wire 70 may be attached to the second end 42 of the threaded shaft 40 in a direction consistent with the general axial direction of the cable 10. Furthermore, proximate or otherwise near the second end 42 of the threaded shaft 40, embodiments of the threaded shaft 40 may include a hole 45 configured to receive a forward end, or first end 71, of the grounding wire 70 after the grounding wire 70 has been wrapped around the outer conductor 14. For instance, when the first end 71 of the grounding wire 70 is retrieved or exits from the opening 13 of the cable jacket 12, the first end 71 of the grounding wire 70 may be passed through hole 45 of the threaded shaft 40 to retainably or securably engage the first end 71 of the grounding wire 70. The hole 45 may have orientation that is transverse to the generally axial direction of the cable 10. In other words, the first end 71 of the grounding wire 70 may engage the threaded shaft 40 in a first direction, and the second end 72 of the grounding wire 70 may engage the threaded shaft 70 in a second direction, wherein the first direction is perpendicular or substantially perpendicularly to the second direction. Embodiments of the hole 45 may be an opening, a tunnel, a bore, a channel, and the like, that allows the first end 71 of the grounding wire 70 to enter and pass through the threaded shaft 40. Furthermore, embodiments of the threaded shaft 40 may include an internal annular groove 48 to accommodate a tensioning device seal element 49. Embodiments of the tensioning device seal element 49 may be an O-ring or comparable elastomeric sealing member that can effectuate a seal to preventingress of moisture and other environmental elements within the housing body 50, which may protect the internals of the cable 10. The tensioning device seal element 49 may reside within groove 48, and when disposed within the housing body 50, the tensioning device seal element 49 may deform and sealing engage the inner surface of the housing body 50 to form an environmental seal within the tensioning device 20.

With reference still to FIGS. 4 and 5, embodiments of the threaded shaft 40 may be made of conductive materials, and can be made of metal or a combination of metals. Physical and electrical contact between the grounding wire 70 and the threaded shaft 40 can enhance the effectiveness of the grounding clamp 100. In one embodiment, the threaded shaft 40 is a tensile screw. Embodiments of the threaded shaft 40 may be a conductive shaft having external threads. Moreover, embodiments of the threaded shaft 40 may be configured to cooperate with an actuator 30 to draw the grounding wire 70 tight and increase a tension on the grounding wire 70. The threaded portion 43 may include external threads having a pitch and depth that corresponds with internal threads 33 of the actuator 30. For instance, the actuator 30 may be threadably engaged with the threaded shaft 40 due to the cooperation between the threaded portion 43 of the threaded shaft 40 and the internal threads 33 of the actuator 30, proximate or otherwise near the first end 41 of the threaded shaft 40. When both ends 71, 72 of the grounding wire 70 are securably engaged to the threaded shaft 40, an installer may actuate the actuator 30 to increase a tension of the grounding wire 70. In other words, an installer may rotate the actuator 30 to increase a tension of the grounding wire 70 due to the interaction between the threads 43, 33 and the relative movement of the components of the tensioning device 20. Embodiments of the actuator 30 may be a nut, or similar component that can be freely rotated about the threaded shaft 40. Embodiments of the actuator 30 may be comprised of conductive or non-conductive materials, or may be comprised of a combination of both.

With reference to FIGS. 1-5, a method of grounding a cable 10 may include the steps of advancing a grounding wire 70 around an outer conductor 14 of the cable 10 through a non-circumferential opening 13 in the cable jacket 12, and then tensioning the grounding wire 70 to reduce the gaps or intermittent contact between the wire 70 and the outer conductor 14 and to seal the non-circumferential opening 13.

Referring now to FIGS. 6-9, another embodiment of a grounding clamp 200 is shown. Like the grounding clamp 100, embodiments of grounding clamp 200 may be configured to attach to a coaxial cable 210 at a mid-span location that is at least some distance away from either end of the cable 210. Again, there may be more than one grounding clamp 200 located at various points along the same cable 210 to facilitate adequate grounding of the cable 210 at a location other than the ends.

Figure 6:
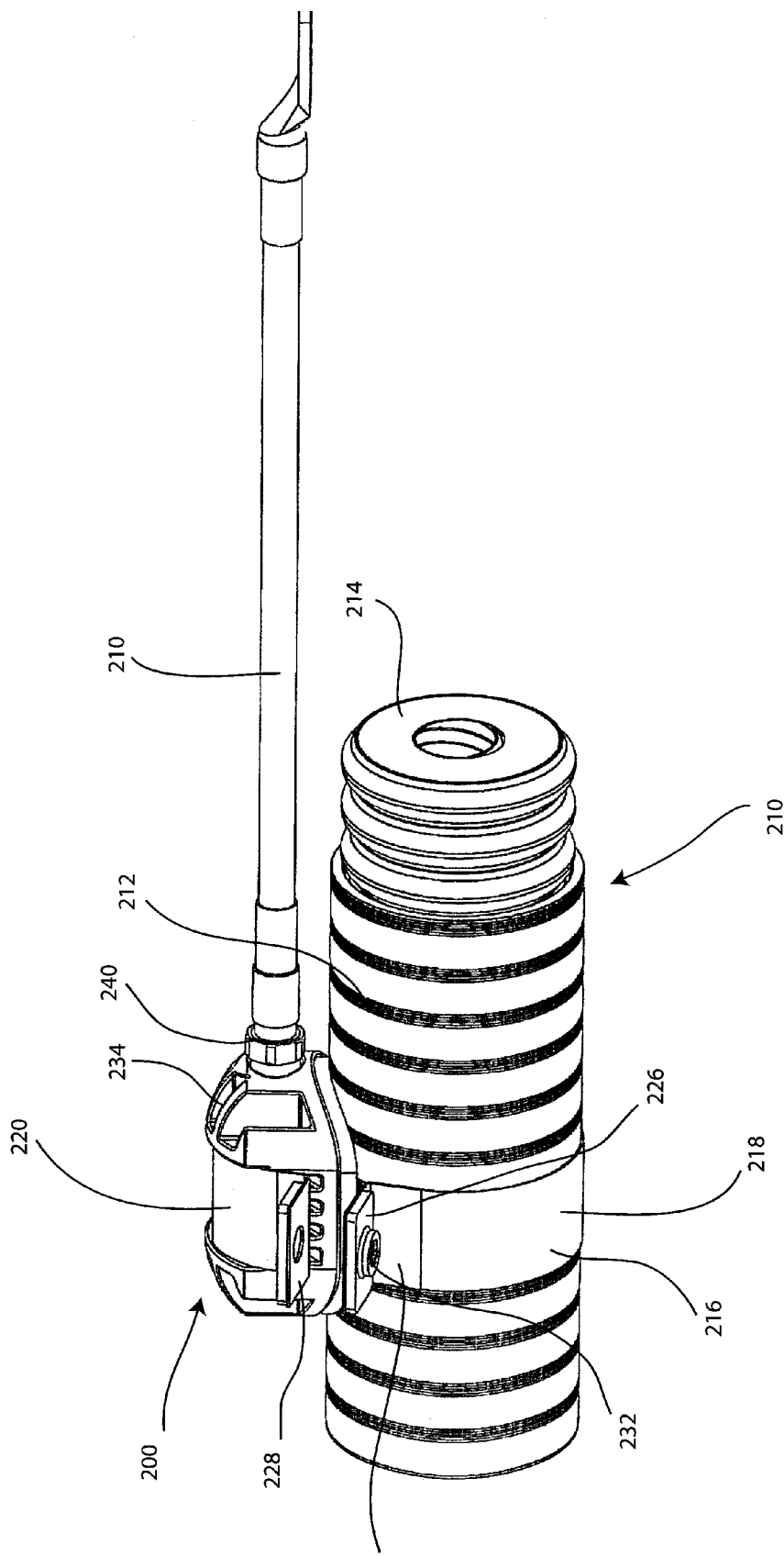
FIG. 6 depicts a perspective view of another embodiment of a grounding clamp attached to an embodiment of a coaxial cable.
Figure 7:
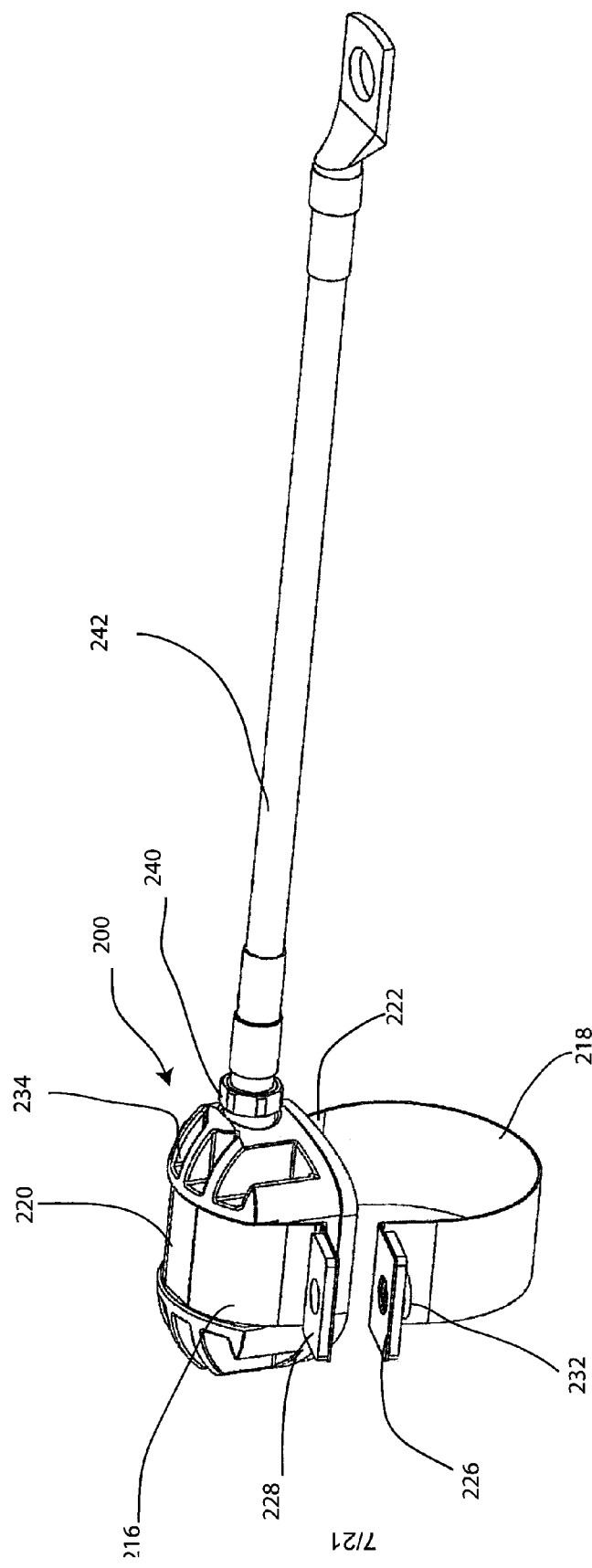
FIG. 7 depicts a perspective view of the grounding clamp of FIG. 6 without the coaxial cable.

FIG. 6 shows the grounding clamp 200 attached to the coaxial cable 210. The coaxial cable 210 may be a corrugated coaxial cable having some or all of the features described hereinabove for the cable 10. Thus, the coaxial cable 210 may include an outer protective jacket 212, similar to the outer projective jacket 12, and an outer conductor 214 similar to the outer conductor 14. Thus, the outer conductor 214 may include valleys, peaks, and annular gaps as described hereinabove. Moreover, the coaxial cable 210 may include a dielectric and a center conductor (not shown). It should be understood that the coaxial cable 210 shown in FIG. 6 is exemplary and that any conduit or cable that includes a corrugated layer covered by a protective sheathing may be used.

The grounding clamp 200 may first include a supporting member 216 that surrounds both the grounding clamp 200 and the coaxial cable 210. The supporting member 216 may be made from a metallic material such as steel, iron, copper, bronze, or the like. In other embodiments the supporting member 216 may be made from plastic or a composite material. The supporting member 216 may be strong enough to tightly hold the grounding clamp 200 to the coaxial cable during external conditions such as wind, rain, and the like. The supporting member 216 may not have a circular cross section in order to accommodate the protruding grounding clamp 200 at one end. In other words, the supporting member 216 may include a first end 218 having a larger curvature than its opposing second end 220. The ends 218, 220 of the supporting member 216 may be separated by a non-curved portion 222 on each side. In another embodiment, shown in FIG. 10, the supporting member 216 may have a circular cross section prior to being tightened around the grounding clamp 200 and the coaxial cable 210.

Figure 10:
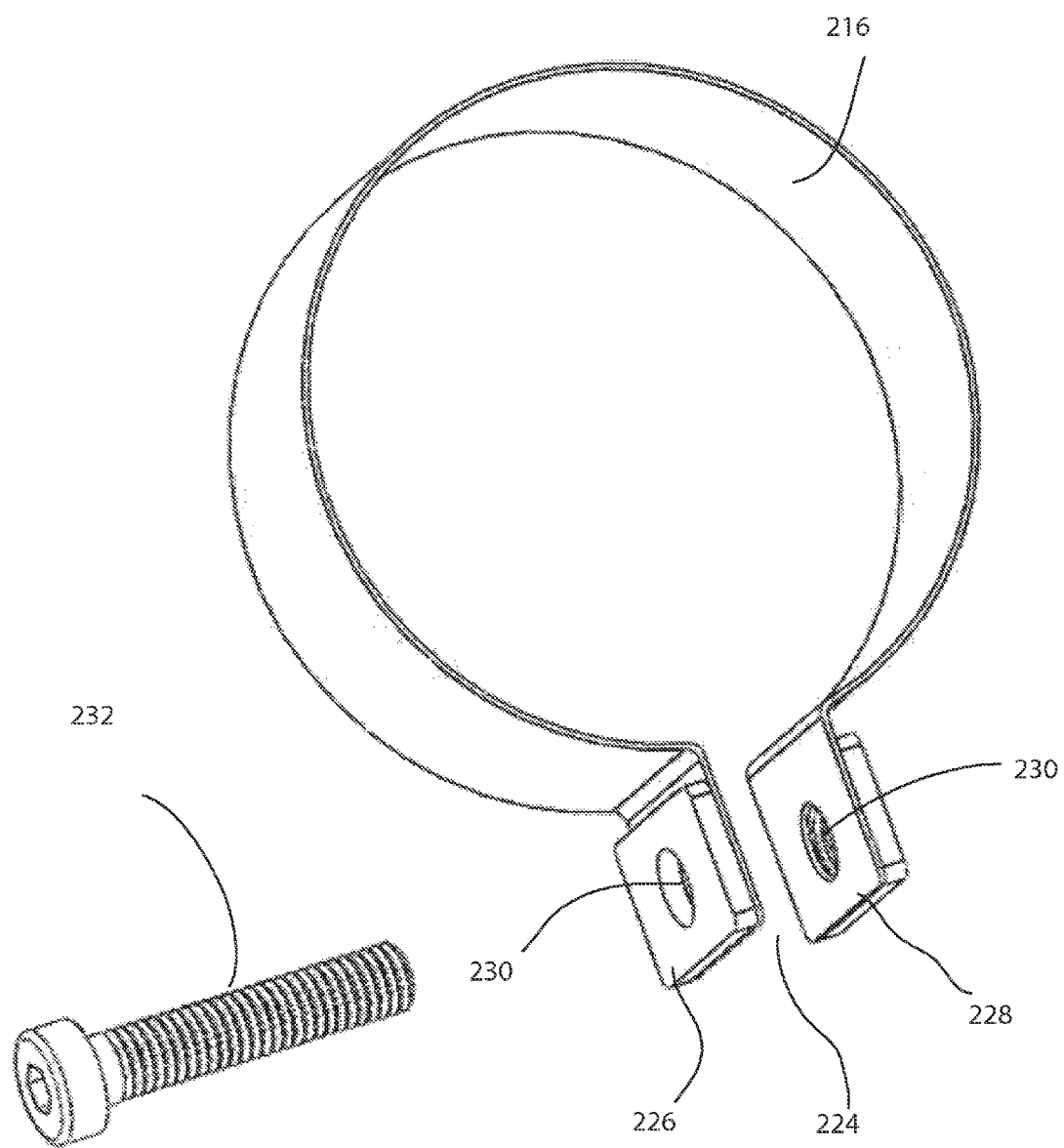
FIG. 10 depicts a perspective view of a supporting member of the grounding clamp of FIGS. 6-9.

As shown in FIG. 10, the supporting member 216 may include an opening 224 that allows the supporting member 216 to be wrapped around the coaxial cable 210 and grounding clamp 200 prior to attachment. The opened supporting member 216 includes a first end 226 and a second end 228 that are each bent such that they are parallel with each other prior to attachment. Each of the bent ends 226, 228 include an opening, hole or bore 230. The opening 230 may be threaded such that it is capable of accepting a threaded bolt 232. The threaded bolt 232 may be configured to close the supporting member 216 around the coaxial cable 210 and the grounding clamp 200. The bolt 232 may be tightened enough such that the grounding clamp 200 does not move about the coaxial cable 210.

The grounding clamp 200 may further include an outer housing component 234. The outer housing component 234 may be made from a plastic or other insulating material, for example. The outer housing component 234 may include a channel 236 across its middle in order to assist in attaching the grounding clamp 200 with the supporting member 216. The outer housing component 234 may further include an opening 238 that is configured to receive a lug 240 via a tool 242 for tightening the lug 240. It should be understood that the opening 238 may also be a bore, hole, cavity, chamber, or the like. The opening 238 is shown to extend within the outer housing component 234 in a parallel direction to the attached coaxial cable 200. However, this orientation is not limiting. However, this orientation and location of the opening 238 may be advantageous in that it avoids intersecting the supporting member 216.

Figure 8:
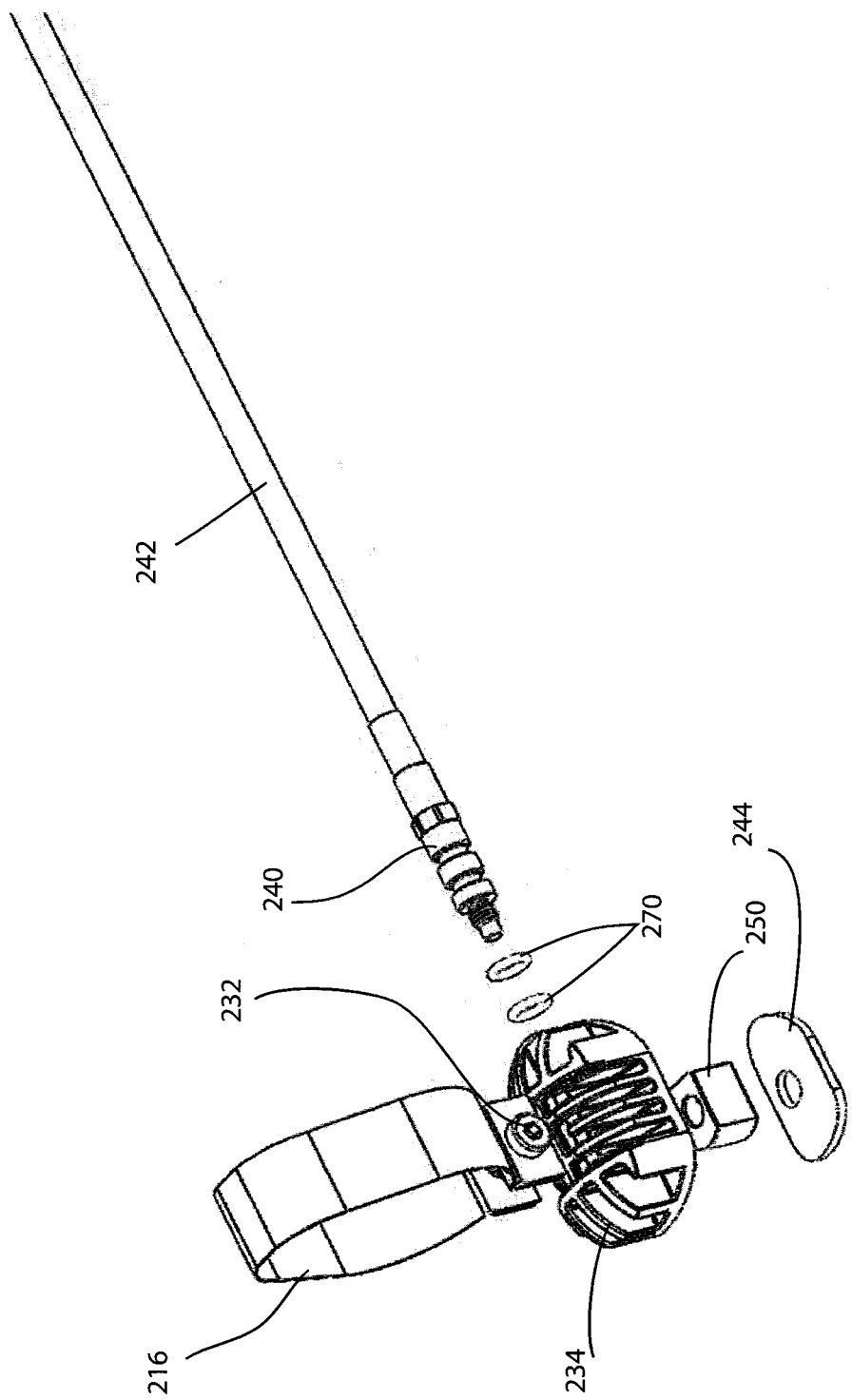
FIG. 8 depicts an exploded view of the grounding clamp of FIGS. 6-7.
Figure 11:
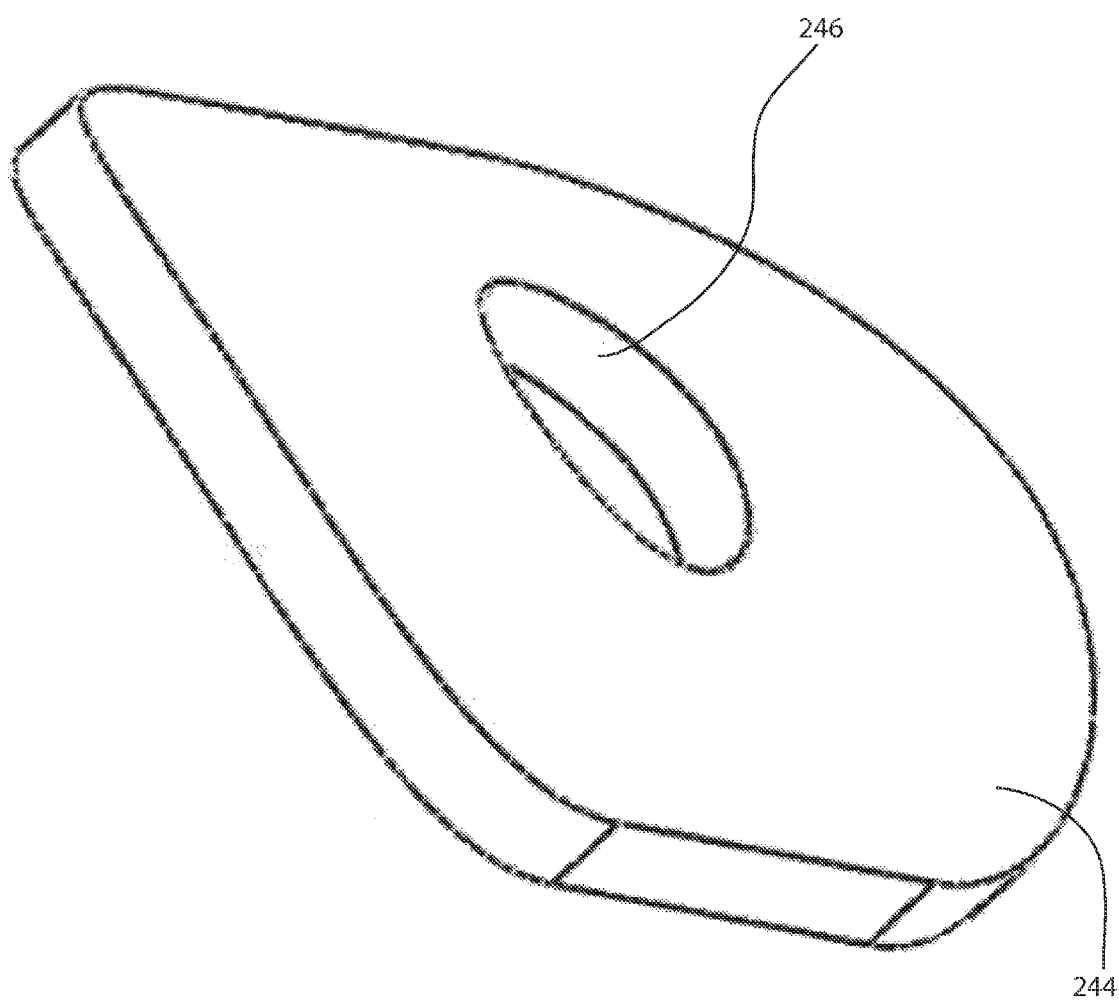
FIG. 11 depicts a perspective view of a curved base member of the grounding clamp of FIGS. 6-9.

Referring now to FIGS. 8 and 11, the grounding clamp 200 may include a curved base member 244. The base member 244 may be made from a metallic or otherwise conductive material. The base member 244 may include the exact same curvature as the type of cable that the grounding clamp 200 is intended to be attached with. Thus, in the embodiment depicted, the base member 244 has the curvature as the outer jacket 212 of the coaxial cable 210. The base member 244 may further include a circular opening 246 in the middle through which two ends of a conductive grounding wire 248 (shown in FIG. 15) will extend after installation. The base member 244 may be tightly held against the outer jacket 212 of the coaxial cable 210 such that the base member 244 is configured to seal the internal components of the grounding clamp 200 from the external elements.

Figure 12:
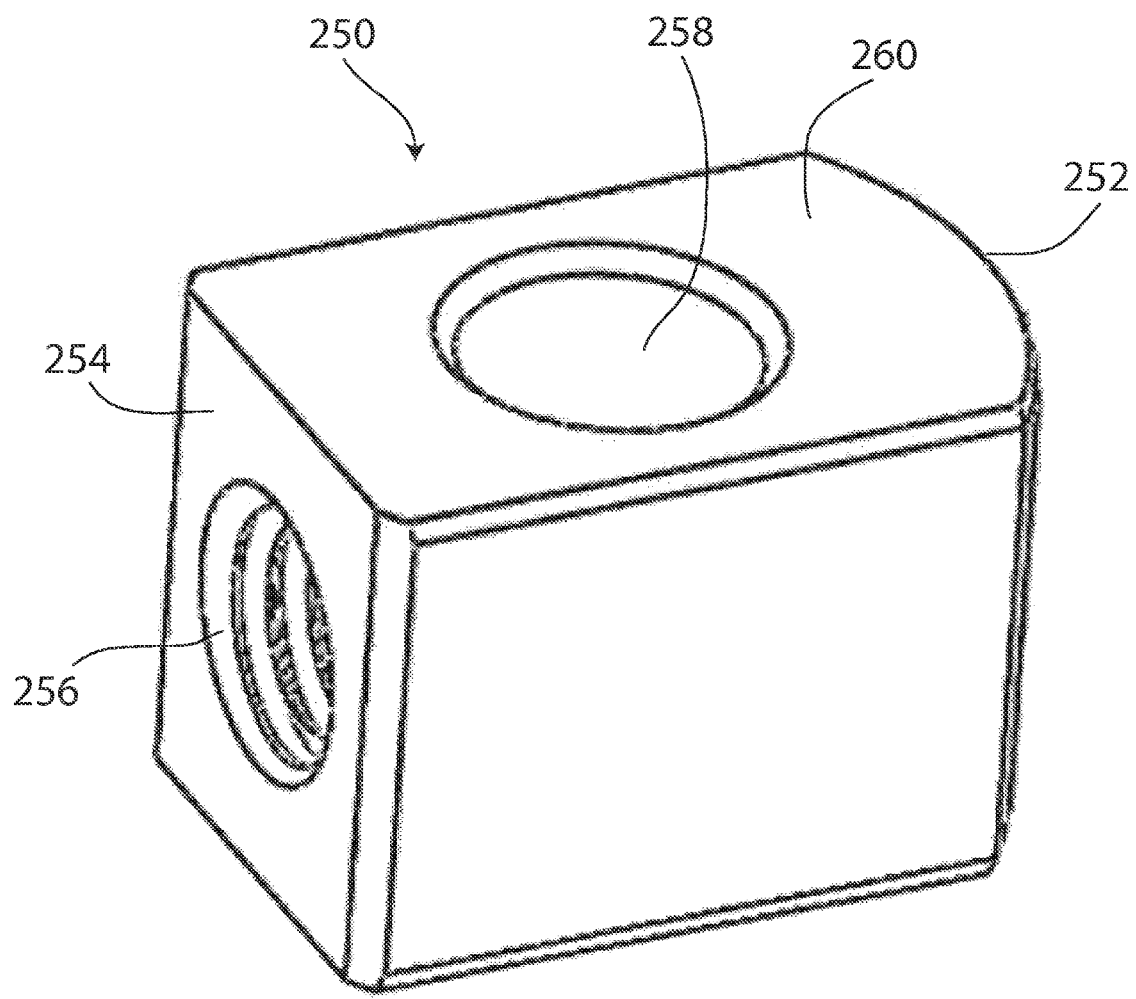
FIG. 12 depicts a perspective view of an inner chamber member of the grounding clamp of FIGS. 6-9.
Figure 13:
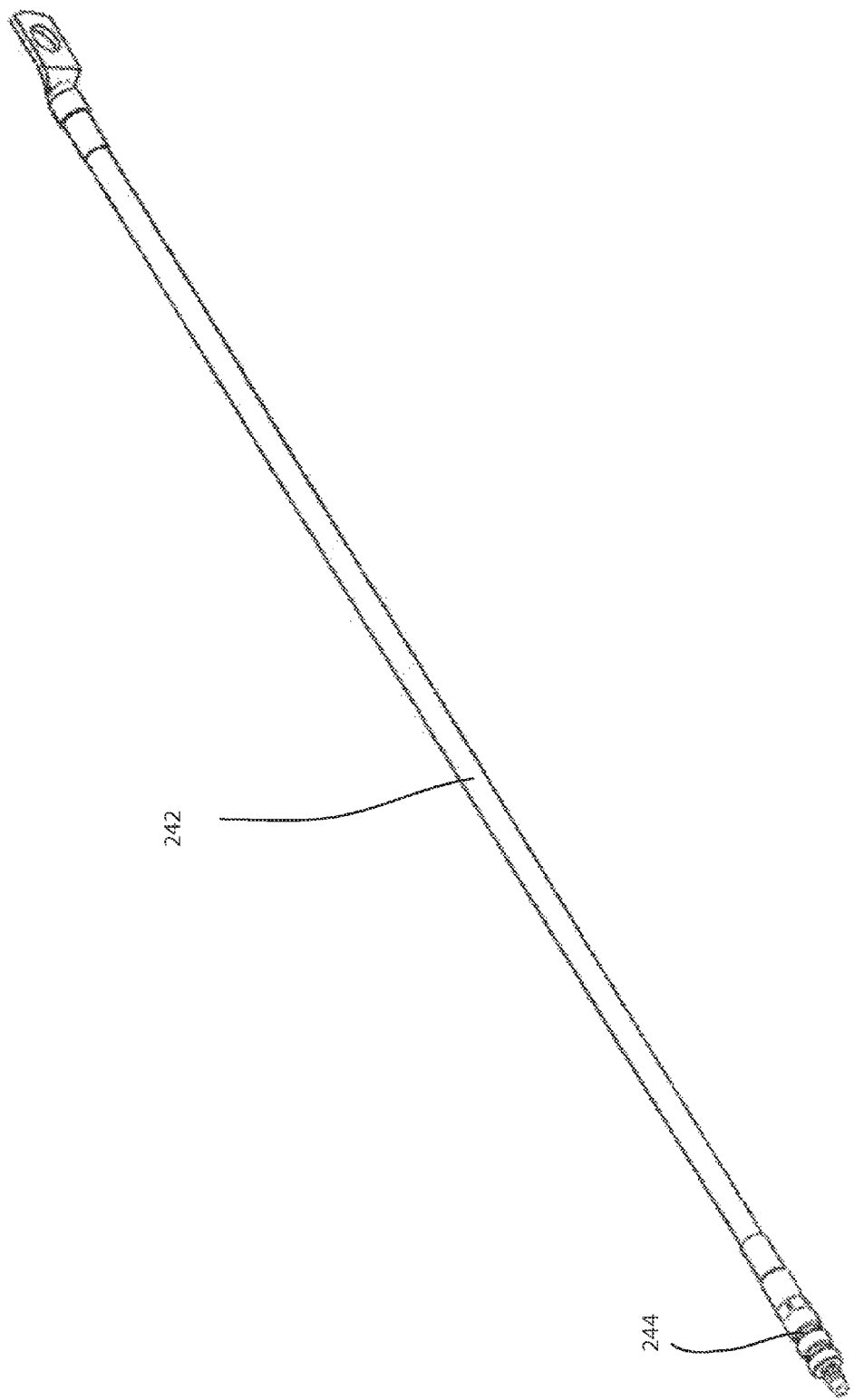
FIG. 13 depicts a tensioning tool for installing the grounding clamp of FIGS. 6-9.

Referring now to FIGS. 8 and 12, an inner chamber member 250 of the grounding clamp 200 is shown. Like the base member 244, the inner chamber member 250 may be made from metallic or otherwise conductive material. The inner chamber member 250 may be largely cubic in shape with one rounded side 252. The rounded side 252 may assist the installer of the grounding clamp 200 in assembling the components of the grounding clamp 200 in the proper orientation. The rounded side 252 may be located opposite a flat side 254 having a first opening 256. This first opening 256 needs to align with the opening 238 found in the outer housing component 234. This opening 256 is configured to receive the threaded end of the lug 240. The inner chamber member 250 further includes a second opening 258 that extends in a perpendicular direction to the first opening 256. The second opening 258 may be located on a bottom surface 260 of the inner chamber member 250. The second opening 258 may or may not extend through the entirety of the inner chamber member 250. Whatever the embodiment, the second opening 258 extends at least through the full length of the first opening 256. The first opening 256 extends into the second opening 258 such that the leading edge of the lug 240 extends into the second opening 258 after being threaded into the first opening 256.

Figure 9:
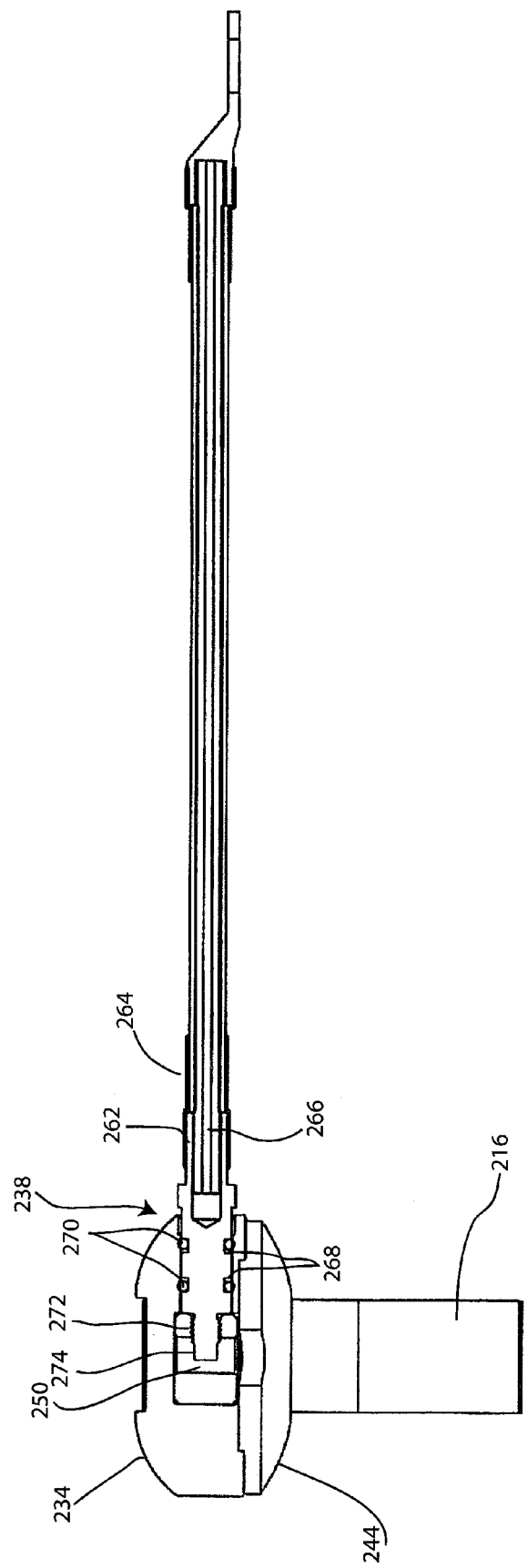
FIG. 9 depicts a side cutaway view of the grounding clamp of FIGS. 6-8.

Referring now to FIG. 9, a cross sectional view of the grounding clamp 200 and the tool 242 is shown without the coaxial cable 210. The lug 240 is shown in this view after being inserted into the opening 238 of the outer housing member 234 and the first opening 256 of the inner chamber member 250. The lug 240 may be a metallic lug having a reduced diameter end 262 that extends into a heat shrink end 264 of the tool 242. The reduced diameter end 262 may extend to an increased diameter portion 264 that is configured to cooperate with the heat shrink end 264 of the tool 242. The entire end of the lug 240 may include an opening that is configured to receive a male protrusion 266 of the tool 242. Thus, the tool 242 and the lug 240 may be operably connected such that the lug 240 can be easily inserted into the openings 238, 256 without falling off of the tool 242.

Shown in FIGS. 8 and 9, the lug 240 may further include two circumferential channels 268 that each are configured to receive circumferential seal rings 270. The seal rings 270 may be made from an elastomeric material such as rubber, and may be inserted into the channels 268 prior to insertion of the lug 240 into the openings 238, 256. The seal rings 270 may further protect the interior of the grounding clamp 200 from the external elements. The seal rings 270 may protrude partially with respect to the surrounding circumference of the lug 240. This protrusion may be reduced by the force of the opening 238 of the outer housing member 234 after insertion of the lug 240. The channels 268 may thus be dimensioned larger than the seal rings 270 to allow for this sealing deformation.

The lug 240 may further include a threaded section 272 after the sealing portion. The threaded section 272 may be configured to integrate with the threaded first opening 256 of the inner chamber 250. Extending from the threaded section 272 may be a protruding end 274 of the lug 240. The protruding end 274 may be configured to protrude into the second opening 258 of the inner chamber member 250. The protruding end 274 may be configured to press into the conductive grounding wire 248 that has been extended through the second opening 258. This may firmly hold the grounding wire 248 into place within the grounding clamp 200.

Upon completion of this insertion of the lug 240, the tool 242 may be removed from the lug 240 by pulling firmly to release the interference fit between the tool 242 and the lug 240. In other embodiments, the lug 240 may be attached to the tool 242 by other mechanisms than that described hereinabove. For example, the lug 240 may be removed from the tool 242 by unsnapping, unscrewing or the like.

Figure 14:
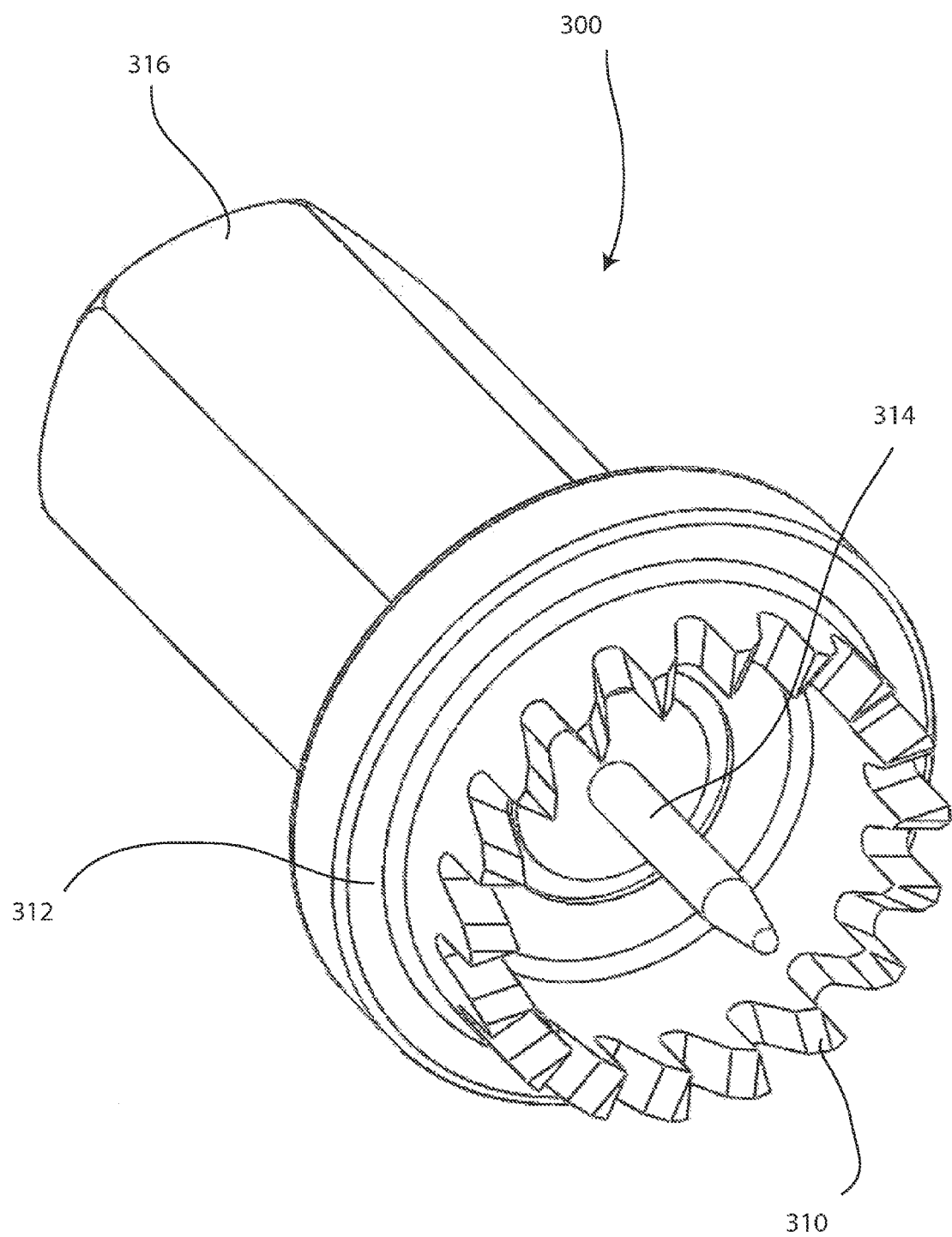
FIG. 14 depicts a drill bit for installing the grounding clamp of FIGS. 6-9.

Referring now to FIG. 14, a drill bit 300 is shown having a plurality of teeth 310. The drill bit 300 may be configured to drill a hole in the outer jacket 212 of the coaxial cable 210 to install the grounding wire 248 within the coaxial cable 210. The drill bit 300 may be configured to drill the hole in the outer jacket 212 without causing any damage or drilling to the inner conductor 214 of the coaxial cable 210. This damage prevention may be achieved in at least two ways.

First the drill bit 300 may be made from a material that is softer than the inner conductive portion of the coaxial cable 214. For example, the drill bit 300 may be made from a relatively hard plastic that will work to remove the outer jacket 212 but will not be hard enough to damage the inner conductor 214. In one embodiment, the drill bit 300 may be a disposable bit. For example, each kit that is sold that includes the grounding clamp 200 may include a disposable bit. While the entire drill bit 300 may be made from a softer material, in other embodiments only the teeth 310 may be made from plastic.

Second, the drill bit 300 may include a greater diameter portion 312 that is located at the base of the teeth 310. The teeth 310 may extend from the greater diameter portion 312 a particular distance that corresponds with the thickness of the outer jacket 212 of the coaxial cable 210. Thus, even if the drill bit 300 was made out of a material that could damage the outer conductor 214 of the coaxial cable 210, the greater diameter portion 312 would prevent the drill bit from penetrating into the outer conductor 214.

The drill bit 300 may further include a base portion 316 that is configured to be attached to a drill device (not shown). The drill bit 300 may be dimensioned such that it creates a large enough diameter opening to accommodate both ends of the grounding wire 248. The drill bit 300 may further include a guiding protrusion 214 that is located in the center of the teeth 310 in order to assist a driller in steadying the drill bit 300. The guiding protrusion 214 may include a pointed end.

Figure 15A:
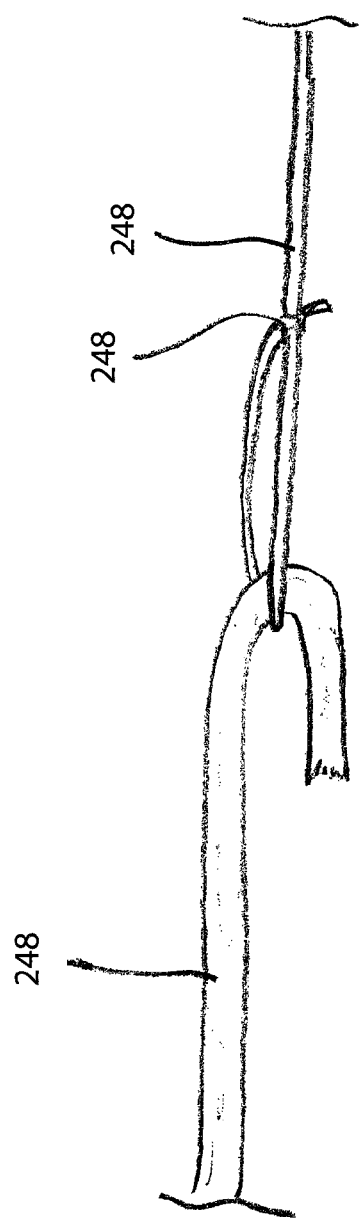
FIG. 15a depicts a fishline tied to a grounding wire prior to installation in a coaxial cable according to one embodiment.

Shown in FIG. 15a is a fishline 400 tied with a knot 430 to the grounding wire 248 prior to installation in the coaxial cable 210. The fishline 400 may be made from a stranded kevlar material. The grounding wire 248 may be made from a tin plated copper metal material. However, these materials are not limiting and any material may be used for the fishline 400 that is more flexible, less rigid, and/or thinner than the grounding wire 248. Moreover, the grounding wire 248 may include any or all of the characteristics of the grounding wire 70 described hereinabove. The knot 430 may be any type of knot that will not break during the fishing process described herein. Moreover, the bend in the grounding wire 248 shown in this embodiment may be a permanent bend in the metallic material that defines the grounding wire 248. Pulling the grounding wire 248 through the valley between the outer conductor 214 and the outer jacket 212 may not unbend the grounding wire 248.

Figure 15B:
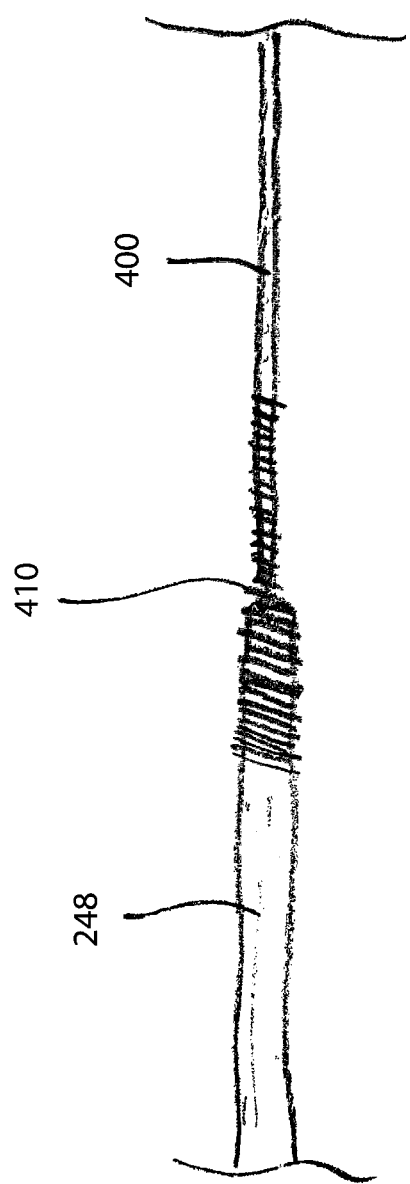
FIG. 15b depicts a fishline tied to a grounding wire prior to installation in a coaxial cable according to another embodiment.
Figure 15C:
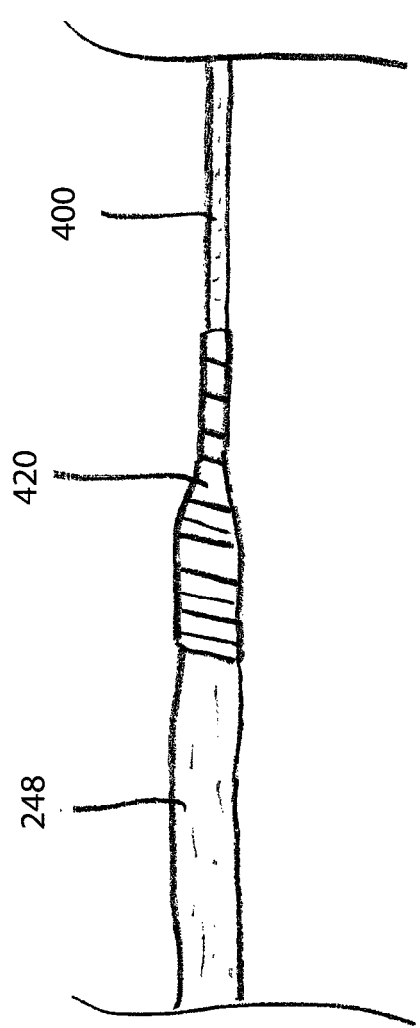
FIG. 15c depicts a fishline tied to a grounding wire prior to installation in a coaxial cable according to yet another embodiment.

In one embodiment shown in FIG. 15b, to attach the fishline 400 to the grounding wire 248, and end of the fishline 400 may be placed next to an end of the grounding wire 248. From there, a thin copper wire 410 may be wrapped many times tightly around both of the fishline 400 and the grounding wire 248. This may attach the grounding wire 248 to the fishline 400 such that pulling the grounding wire 248 through the valley between the outer conductor 214 and the outer jacket 212 may not unattach the grounding wire 248 from the fishline 400.

In another embodiment, once the thin copper wire 410 is sufficiently wrapped around both the fishline 400 and the grounding wire 248 (as shown in FIG. 15b) or the knot 430 ties the grounding wire 248 to the fishline 400 (as shown in FIG. 15a), a tape 420 may be wrapped around the thin copper wire 410 thereby reinforcing the connection between the fishline 400 and the grounding wire 248. This tape may be electrical tape, duct tape, or any tape that will help to temporarily support the connection between the grounding wire 248 and the fishline 400.

In other embodiments, the fishline 400 and the grounding wire 248 may be attached via a compression connector (not shown) or other mechanical device may be utilized to attach the fishline 400 with the grounding wire 248 that may be easily decompressed and removed. Whatever the embodiment, it should be understood that the mechanism or knot that attaches the fishline 400 and the grounding wire 248 should be strong enough to allow the fishline 400 to pull the grounding wire 248 therethrough while also allowing the fishline 400 to be easily removed from the grounding wire 248 after the grounding wire 248 has been pulled through into position. Moreover, the knot or mechanism may not have a much greater circumference than the grounding wire 248, which already may be difficult to pull through the valley between the outer conductor 214 and the outer jacket 212 due to its greater circumferential dimension than the fishline 400. In the embodiment where the thin copper wire 410 is wrapped around each of the fishline 400 and the grounding wire 248, the thin copper wire 410 may be spread across a length of each of the fishline 400 and the grounding wire 248 so as to not increase the diameter of the two lines significantly, while still managing to maximize the holding force provided by the connection.

The fishline 400 is configured to be inserted into an opening (not shown) made by the drill bit 300 in the outer jacket 212 of the coaxial cable 210. From there, the fishline 400 may be "fished" through the crevice or channel defined by a valley of the outer conductor 214. The insertion of the fishline into the opening made by the drill bit 300 may be performed manually or may be alternately facilitated with an automatic fishing tool (not shown). The material of the fishline 400 may be rigid enough that under compression caused by the jacket 212 and the outer conductor 214 it doesn't buckle and deform. However, the fishline 400 may also be flexible enough that it should bend around the outer conductor 214 upon insertion. Relative to the grounding wire 248, the fishline may be at least one of: more flexible; less rigid; and thinner. This may allow the fishline 400 to be more easily fished through the valley between the outer jacket 212 and the outer conductor 214 than the grounding wire 248. The grounding wire 248 may thus more easily be "pulled" through the valley behind the fishline 400 than it would be to simply fish the grounding wire 248 through the valley without the fishline 400.

In practice, the installer of the grounding clamp 200 may first take a drilling tool and attach the drill bit 300. The installer may then locate a valley portion along a length of the coaxial cable 210. The installer may then center the drill bit 300 on the desired valley and drill a hole until the greater diameter portion 312 of the drill bit 300 prevents the drill bit 300 from drilling any further. The installer may then insert the fishline 400 into the opening defined by the drill bit 300 in the outer jacket 212. Due to its material properties, the fishline 400 is rigid enough to be fished through the valley between the outer jacket 212 and the outer conductor 214. The fishline 400 is also flexible enough to bend around the coaxial cable 210. The fishline 400 has enough length that it may be pushed completely through the valley until the leading edge emerges back to the opening drilled by the drill bit 300. The leading edge of the fishline 400 is then pulled out of the opening. From there the installer pulls both the remaining portion of the fishline 400 through the valley, along with the attached grounding wire 248. The grounding wire 248 has enough length that its two ends are configured to stick out of the opening a certain length. Once the grounding wire 248 is in position, the fishline 400 may be removed by untying the knot or undoing whatever attachment mechanism or compression connector connects the two components. In the embodiment that the fishline 400 is attached to the grounding wire 248 with the thin copper wire 410, the user may first untape the copper wire 410, and then unwrap the thin copper wire 410 from the fishline 400 and the grounding wire 248 separating the two.

Once the fishline 400 has been removed from the grounding wire 248, the installer may begin to locate and put together the pieces of the grounding clamp housing. First, the installer may locate the outer housing component 234. The installer may place the inner chamber member 250 within a cavity of the outer housing component 234 that is configured to accept the inner chamber member 250. The installer may then place the base member 244 below the inner chamber member 250. It should be understood that the outer housing component 234, the inner chamber member 250 and the base member 244 may be provided to the installer in an attached state so that no assembly is necessary. Once the installer has attached or located the already attached components, the installer may put both ends of the grounding wire 248 sticking out of the opening in the outer jacket 212 into the opening 246 of the base member 244 and also through the second opening 258 of the inner chamber member 250. The installer may thus place these three components of the grounding cavity 200 on top of the coaxial cable 210 in position. Next, the installer may place the supporting member 216 around both the coaxial cable 210 and the outer housing member 234 of the grounding clamp 200. The installer may tighten the nut 232 to secure the housing 234 on top of the coaxial cable 210 with the supporting member 216.

Finally, the installer may insert the tool 242 with the attached lug 240, which already may include the rings 270 attached thereto, into the opening 238 of the outer housing 234 and the first opening 256 of the inner chamber member 250. The lug 240 may be screwed into the threads of the first opening 256 such that it biases or securely presses against both of the ends of the grounding wire that are located within the second opening 258. From there, the installer may remove the tool 242 from the lug 240 by firmly pulling the tool 242 away. The grounding clamp 200 may thus be installed onto the coaxial cable 210.

In other embodiments, it is contemplated that no fishing of a fishline 400 may be necessary. For example, a device may be configured to insert a liquid phase metallic conductive substance into the valley that may be configured to harden very quickly once it is exposed to the coaxial cable 210 and out of the device. As the liquid phase metal is hardening, the installer may hold a protruding conductor out of the opening that is configured to be inserted into the opening 246 of the base member 244 and through the second opening 258 of the inner chamber member 250. The liquid phase metal in conjunction with the protruding solid phase conductor may comprise another embodiment of the grounding wire 248. In other embodiments, as described hereinabove, the grounding wire 248 may be insertable automatically with a push-button or triggered automatic fishing device, so that the fishline need not be manually inserted through the valley between the outer conductor 214 and the outer jacket 212.

Figure 16A:
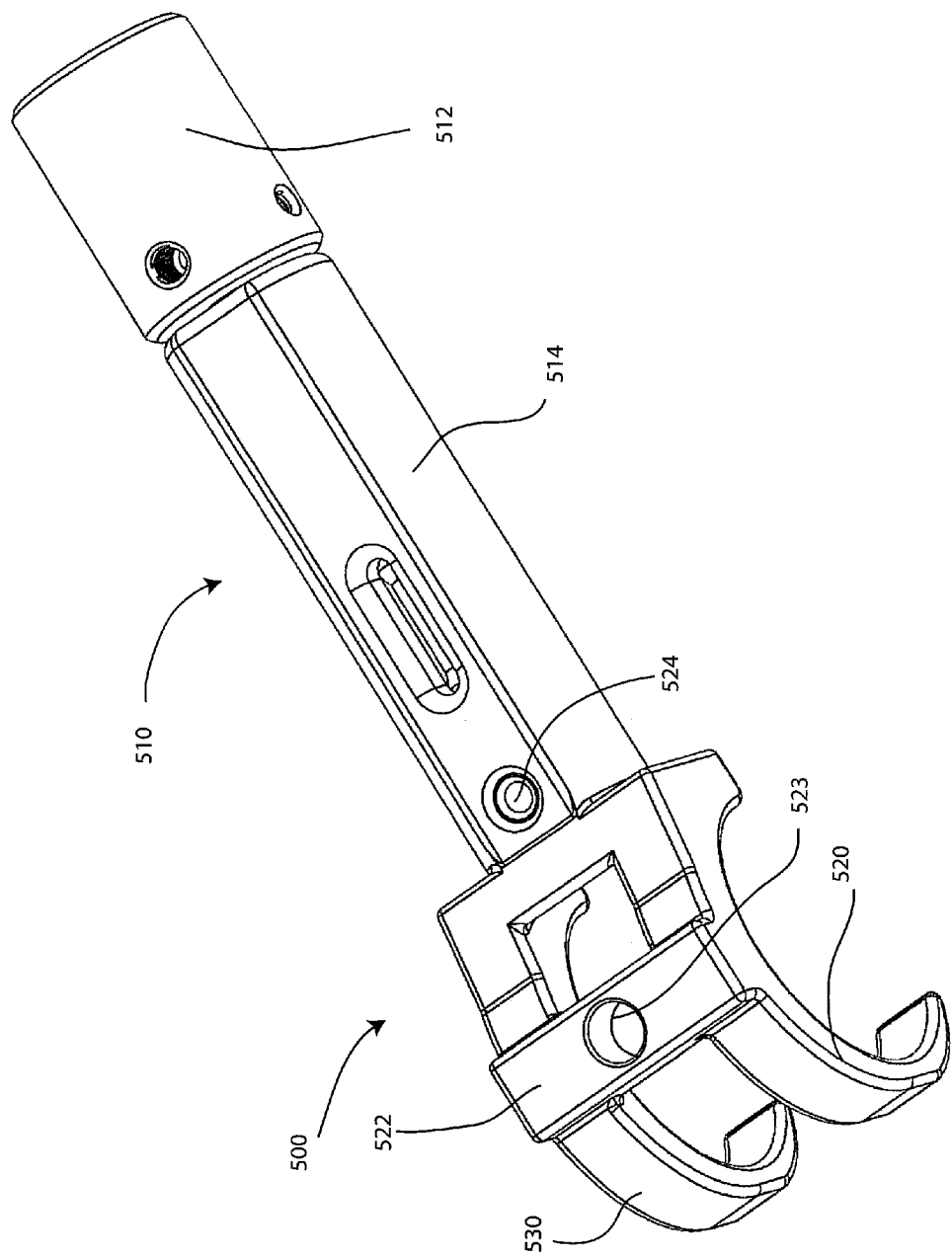
FIG. 16a depicts a perspective view of a tool for facilitating pulling a grounding wire through a coaxial cable according to another embodiment.
Figure 16B:
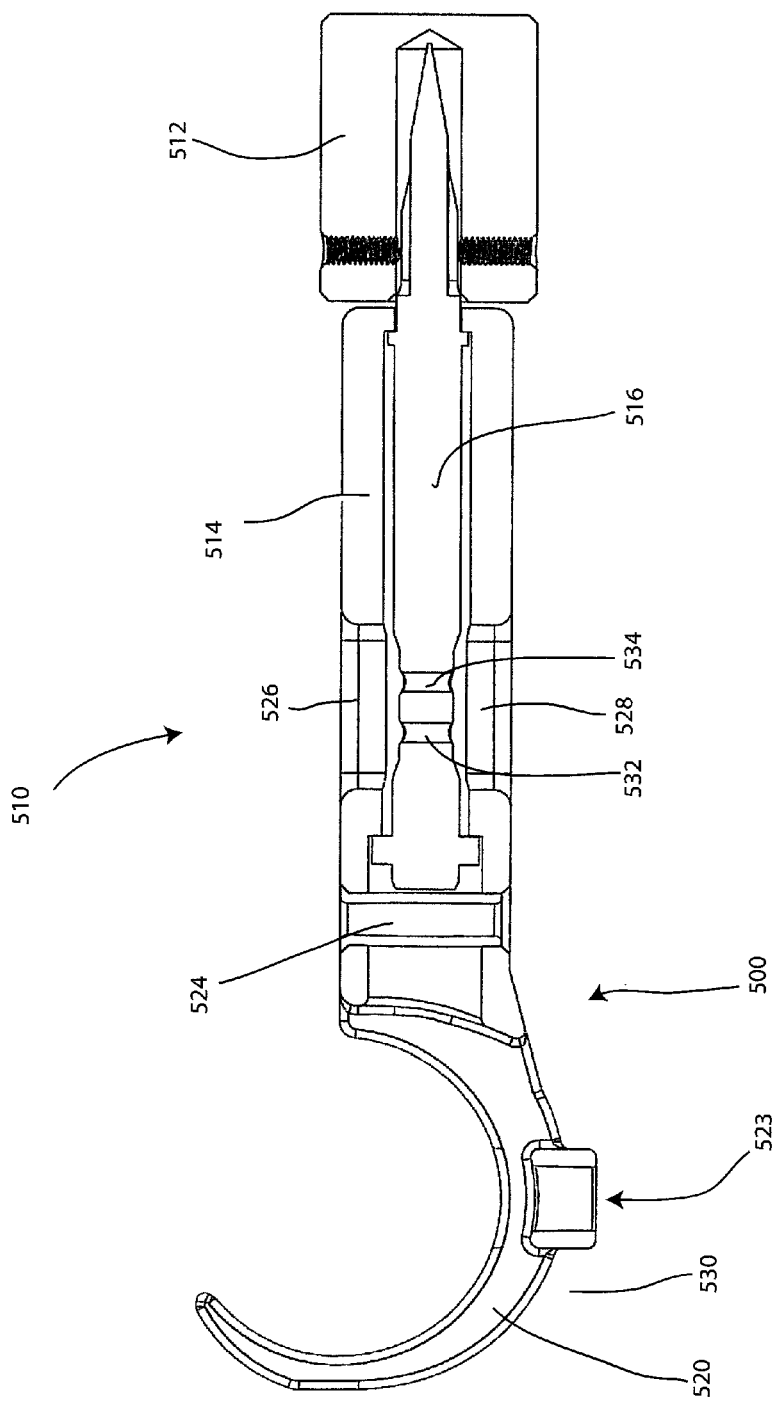
Figure 16C:
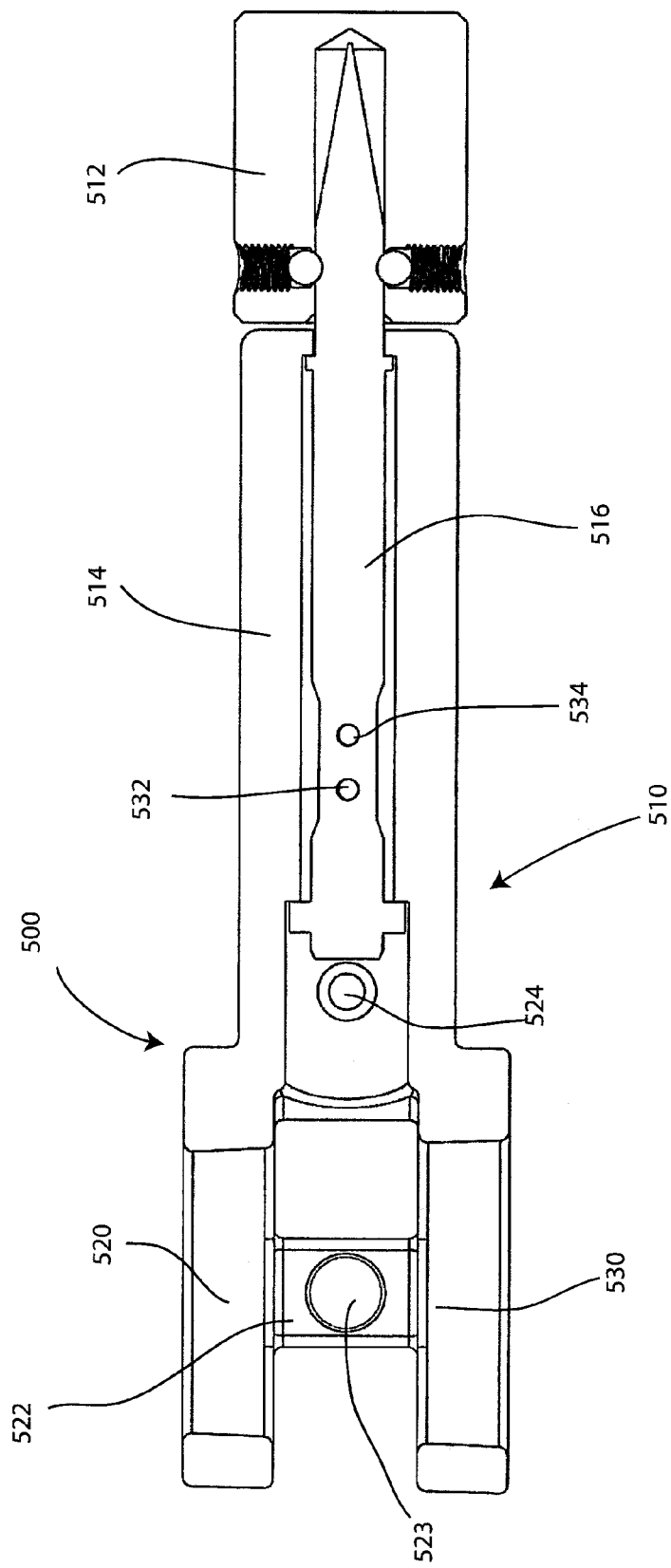
FIG. 16c depicts a bottom cutaway view of the tool of FIGS. 16a and 16b.

Referring now to FIGS. 16a-16c is a tool 500 which may be utilized in order to facilitate pulling the fishline 400 and the grounding wire 248 through the coaxial cable 210. The tool 500 may include two fingers 520, 530 extending from the handle 510. The fingers 520, 530 may be curved with either the same or substantially the same radius of curvature as the corrugated coaxial cable 210 that the tool 500 is intended to operate with. The fingers 520, 530 may be configured to clamp, snap or otherwise attach onto the coaxial cable during operation. The fingers 520, 530 may also extend circumferentially more than 180 degrees. To attach the tool 500 about the cable 210, the fingers 520, 530 may be made of a slightly pliable material such that they can expand when the cable 210 is inserted therein. The fingers 520, 530 may then contract back to a neutral state when the cable 210 is located properly directly within the grip of the fingers 520, 530. It should be understood that the tool 500 and the cable 210 may be different sizes than the embodiments shown, but the curvature may be configured to wrap around the cable whatever its size.

The tool 500 may include a handle 510 having an end piece 512 and an outer member 514 or middle portion. Within the tool may be an inner tool member 516. In the embodiment shown, rotating the end piece 512 may directly cause rotation of the inner tool member 516. In other words, the end piece 512 and the inner tool member 516 may be operably connected such that rotation of the end piece 512 automatically rotates the inner tool member 516. However, the rotation of the end piece 512 may not cause rotation of the outer member 514. Thus, rotation of the end piece 512 may cause rotation of the inner tool member 516 about the outer member 514. In some embodiments, it should be understood, the end piece 512 and the inner member 516 may actually be a singular integrated component, rather than two separate components. The ease of manufacturing and assembly may determine whether these components may be separate or integrally combined. The tool 500 may further be made of plastic, metal, a composite material, or the like. Moreover, different components of the tool 500 may be made from different suitable materials.

The tool 500 may further include an adjoining member 522 extending between the first finger 520 and the second finger 530. The adjoining member 522 may include a first opening 523 that extends completely through the adjoining member 522. The first opening 523 may be configured to receive the fishline 400 during operation. It should be understood that the adjoining member 522 may not be necessary in some embodiments of the tool 500. However, the adjoining member 522 may provide structural support and may facilitate in retaining the fishline 400 in the proper position as the tool 500 moves around the coaxial cable 210 to facilitate the fishing of the grounding wire 248 through the coaxial cable 210. The first opening 523 may be larger or smaller, and may not be circular in cross section but instead may be elongated in some embodiments.

The handle 510 of the tool 500 may include a second opening 524 through the handle 510. The second opening 524 may also be configured to receive the fishline 400 in operation, as described hereinbelow. The second opening 524 may extend through the handle 510 in a parallel direction as the first opening 523. The second opening 524 may further extend completely through the entirety of the handle 510. The second opening 524 may be located between the fingers 520, 530 and the inner tool member 516. The second opening 524 is shown to be smaller than the first opening 523. Alternately, the second opening 524 may be the same size as the first opening 523.

The outer member 514 may include a first elongated opening 526 that provides access to the inner member 516. The outer member 514 may include a second elongated opening 528 that also provides similar access to the inner member 516. The first and second elongated openings 526, 528 may be dimensionally the same, but may be located on opposing sides of the outer member 514. The inner member 516 of the tool 500 may include two inner opening members 532, 534 located along a length of the inner member 516 which correspond to the location where the first and second elongated openings 526, 528 are located in the outer member 514. The two inner member openings 532, 534 may extend completely through the entirety of the inner member 516. Thus, the inner member openings 532, 534 are accessible via the first and second elongated openings 526, 528 provided that the inner member 516 is in a rotated state such that the two inner member openings 532, 534 are aligned circumferentially with the first and second elongated openings 526, 528.

The inner member 516 may include a first greater circumference portion 542 located at the distal end of the tool 500 relative to the coaxial cable attachment end. The inner member 516 may include a second greater circumference portion 544 located at a proximate end of the tool relative to the coaxial cable attachment end. The first and second greater circumference portions 542, 544 may be configured to retain the inner member 516 within the outer member 514 but still allow for rotation of the inner member 516 about the outer member 514.

Figure 17:
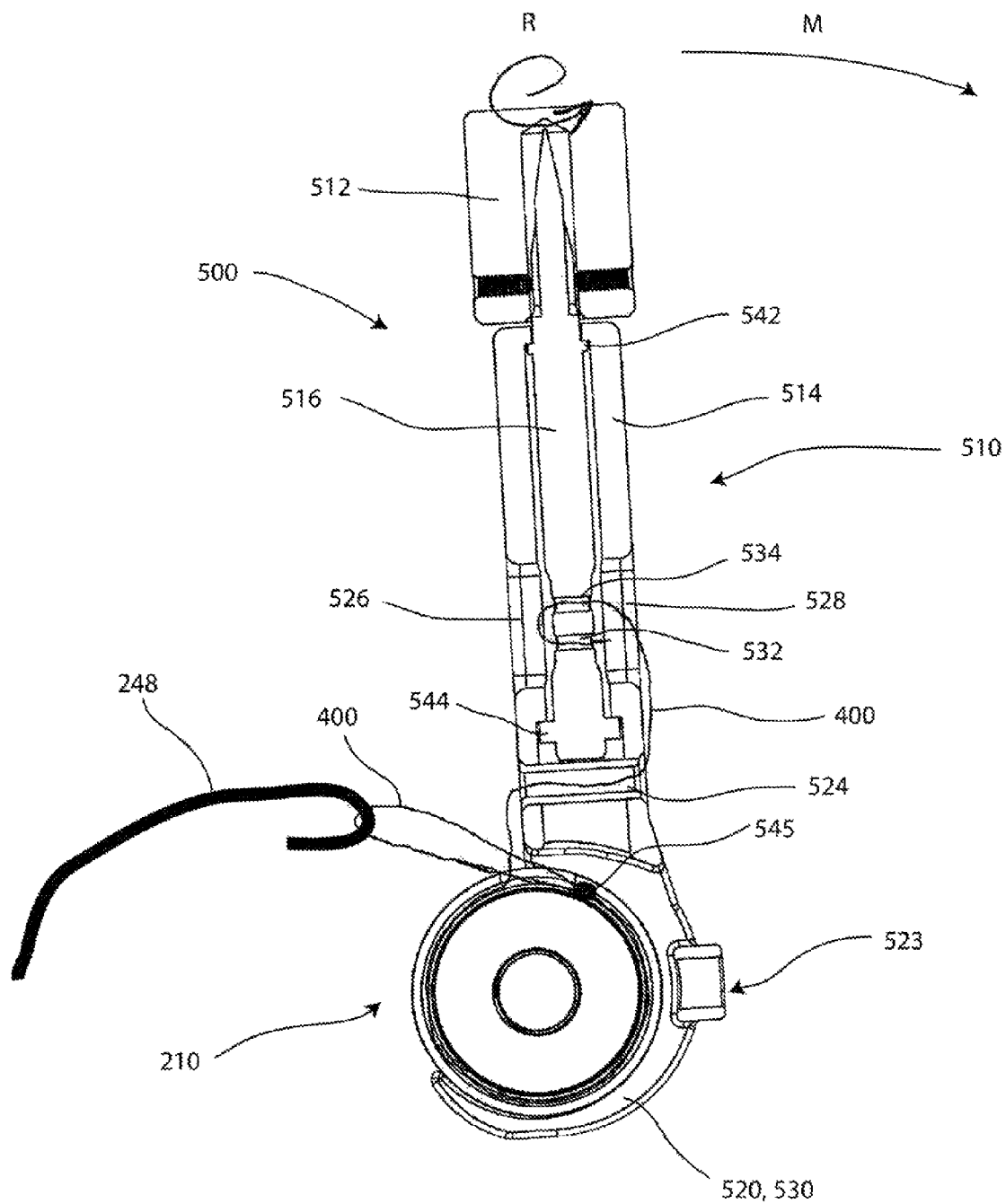
FIG. 17 depicts the tool of FIGS. 16a-16c pulling a grounding wire through a coaxial cable according to another embodiment.

Referring now to FIG. 17, the tool 500 is configured to assist in fishing the grounding wire 248 through the coaxial cable 210. In practice a user may first create a loop 550 in the fishline 400 by tying and end of the fishline 400 to itself at a knot location 545. In the embodiment shown, the looped end 550 may be inserted into the coaxial cable 210 in an opening created, for example, by the drill bit 300 as described hereinabove. The looped end 550, for example, may be inserted counter clockwise in accordance with FIG. 17. Because of the flexibility and the small cross sectional area of the fishline 400, it may be configured to slide between the jacket and the outer conductor of the coaxial cable 210 without trouble. Once the looped end 550 of the fishline is fully wrapped around the coaxial cable 210 is may be pulled from the same coaxial cable opening that it was originally inserted into. Next, this looped end may be attached to the grounding wire 248 as shown in FIG. 15a, for example. Thus, the grounding wire 248 may simply be bent around the looped portion. Because of the rigidity of the grounding wire 248, a simple bend such as that shown in FIG. 15a may retain the connection between the grounding wire 248 and the fishline 400 during the fishing process.

At this point, the opposing non-looped end of the fishline 400 may be attached through the second opening 524 of the handle 510 of the tool 500. Then, the non-looped end of the fishline 400 may be extended through the first and second openings 534, 532 of the inner member 516 by aligning these openings with the elongated access openings 526, 528. The fishline 400 may extend in a first direction through a first one of the openings 534, 532 and may extend through a second opposite direction through a second one of the openings 534, 532. At this point, the fishline 400 may become attached to the inner member 516 by rotating the inner member 516 about the outer member 514 in the rotational direction R. This may be configured to reduce and prevent the slack in the fishline 400 prior to pulling the grounding wire 248 through the coaxial cable 210.

Once this setup has been complete, the tool 500 may be rotated about the coaxial cable in a direction M. In order to prevent the fishline 400 from surrounding the coaxial cable 210 and causing damage to the outer jacket due to the high amount of pressure on the fishline 300 at the location closest to the opening created by the drillbit 300, the tool 500 may only need partially around the coaxial cable 210 before being rotated back to the starting point. The tool 500 may thereby operate similar to a standard ratchet where it may be brought back to a home position and then rotated again. Thus, after a partial rotation of the tool 500 in the M direction, the tool 500 may be brought back to the original starting position, which create slack in the fishline 400. The inner member 516 may be rotated about the outer member 514 in the R direction in order to tighten the slack in the fishline 400 and allow the tool to be further rotated about the coaxial cable 210 to cause the grounding wire to be moved therethrough once again by moving the tool 500 in the M direction once again. This ratchet style configuration prevents the need for the tool 500 to be clear to rotate fully around the coaxial cable 210. In the field, it would be often times impossible for the tool 500 to rotate fully around the coaxial cable 210 due to the existence of other cables and obstructions adjacent to the operating cable 210.

Further contemplated is a method of installing a grounding clamp, such as the grounding clamp 200, which includes attaching a fishline, such as the fishline 400, to a grounding wire, such as the grounding wire 248. The method may further include inserting the fishline through an opening of a corrugated coaxial cable, such as the coaxial cable 210, in a valley located between an outer conductor, such as the outer conductor 214, and an outer jacket, such as the outer jacket 212. The fishline may be rigid enough that it does not buckle or deform significantly under the pressure of the outer conductor and the outer jacket. The fishline may also be flexible enough that it bends around the corrugated coaxial cable. The method may further include bending the grounding wire around the fishline to attach the two. The method may include wrapping the fishline tightly around the grounding wire to attach the two. The method may further include taping the fishline to the grounding wire. The method may further include attaching the fishline to a tool, such as the tool 500, and rotating the tool around the corrugated coaxial cable in order to insert the grounding wire through the opening of the corrugated coaxial cable. The method may further include attaching the fishline to a handle of the tool. The tool may further include two fingers, such as the fingers 520, 530 extending from the handle, the two fingers curved with at least one of the same and substantially same radius of curvature as the corrugated coaxial cable. The method may further include rotating an inner member of the handle, such as the inner member 516 about an outer member, such as the outer member 514, in order to reduce the slack on the fishline caused by bringing back the tool to a starting rotational position on the coaxial cable.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A grounding clamp comprising:
a grounding wire circumscribing an outer conductor of a coaxial cable and having two ends configured to extend out an opening in an outer jacket of the coaxial cable;
a housing adjacent the coaxial cable and having a first opening aligned with the cable opening, a second opening and an inner chamber, the first and second openings providing access to the inner chamber, the housing configured to receive both ends of the grounding wire in the inner chamber through the first opening;
a securing member comprising at least a shaft disposed within the housing configured to secure both ends of the grounding wire within the inner chamber and urge the grounding wire into positive electrical contact with the outer conductor in response to axial motion of the shaft, and
a sliding seal disposed between the shaft and the housing.

2. The grounding clamp of claim 1, further comprising a threaded nut and wherein the shaft is threaded, and extends beyond the second opening in the housing to receive the threaded nut, the nut bearing against the face surface of the second opening to effect axial motion of the threaded shaft.

3. The grounding clamp of claim 1, wherein the coaxial cable includes an outer conductor that is corrugated, and wherein the grounding wire is configured to fit within a channel between the outer conductor and outer jacket of the coaxial cable.

4. The grounding clamp of claim 2, wherein the threaded shaft includes an opening that is configured to receive a male protrusion of a tool.

5. The grounding clamp of claim 2, wherein the threaded shaft includes at least one circumferential channel, the at least one circumferential channel configured to receive an elastomeric seal ring.

6. The grounding clamp of claim 1, further comprising an inner chamber member that defines at least a portion of the inner chamber, the inner chamber member housed within the housing, wherein the inner chamber member includes a first opening configured to receive both ends of the extending wire, and wherein the inner chamber member further includes a second opening configured to receive the securing member that is configured to secure both ends of the grounding wire within the inner chamber.

7. The grounding clamp of claim 1 wherein the grounding wire interposes the outer jacket and the outer conductor of the coaxial cable.

8. The grounding clamp of claim 1 wherein the shaft is displaced axially in response to rotation thereof.

9. The grounding clamp of claim 1 further comprising a static seal between the outer jacket and the first opening of the housing.

10. The grounding clamp of claim 9 wherein the static seal provides an environmental seal between the first and cable openings.

11. The grounding clamp of claim 10 wherein the sliding seal provides an environmental seal between the second opening and the shaft.

* * * * *